(12) United States Patent
Chang et al.

(10) Patent No.: US 11,120,059 B2
(45) Date of Patent: Sep. 14, 2021

(54) CONVERSATIONAL QUERY ANSWERING SYSTEM

(71) Applicant: Adobe Inc., San Jose, CA (US)

(72) Inventors: Walter W. Chang, San Jose, CA (US);
Jonathan Brandt, Santa Cruz, CA (US); Doo Soon Kim, San Jose, CA (US)

(73) Assignee: ADOBE INC., San Jose, CA (US)

( * ) Notice: Subject to any disclaimer, the term of this patent is extended or adjusted under 35 U.S.C. 154(b) by 212 days.

(21) Appl. No.: 16/020,328

(22) Filed: Jun. 27, 2018

(65) Prior Publication Data

US 2020/0004873 A1    Jan. 2, 2020

(51) Int. Cl.
| | |
|---|---|
| *G06F 16/00* | (2019.01) |
| *G06F 16/332* | (2019.01) |
| *G06F 16/93* | (2019.01) |
| *G06F 16/33* | (2019.01) |
| *G06F 16/338* | (2019.01) |
| *G06F 16/31* | (2019.01) |

(52) U.S. Cl.
CPC .......... *G06F 16/3329* (2019.01); *G06F 16/31* (2019.01); *G06F 16/338* (2019.01); *G06F 16/3322* (2019.01); *G06F 16/3344* (2019.01); *G06F 16/93* (2019.01)

(58) Field of Classification Search
CPC .. G06F 16/3329; G06F 16/3322; G06F 16/93; G06F 16/3344; G06F 16/338; G06F 16/31; G06F 16/313; G06F 16/22
See application file for complete search history.

(56) References Cited

U.S. PATENT DOCUMENTS

| | | | | |
|---|---|---|---|---|
| 2014/0114649 | A1* | 4/2014 | Zuev | G06F 16/3344 704/9 |
| 2016/0275180 | A1* | 9/2016 | Matskevich | G06F 16/93 |
| 2018/0240135 | A1* | 8/2018 | Reeves | G06Q 30/0201 |

OTHER PUBLICATIONS

McKevitt, Paul, "Editorial: Intelligent Help Systems for UNIX:Computational Models and Systems", Artificial Intelligence Review, 2000, 14:1-4.

Williams, Jason D., "Applying POMDPs to Dialog Systems in the Troubleshooting Domain", In Proceedings of the Workshop on Bridging the Gap: Academic and Industrial Research in Dialog Technologies, Association for Computational Linguistics, Apr. 2017, pp. 1-8.

* cited by examiner

*Primary Examiner* — Paul Kim
(74) *Attorney, Agent, or Firm* — F. Chau & Associates, LLC

(57) ABSTRACT

Techniques of directing a user to content based on a semantic interpretation of a query input by the user involves generating links to specific content in a collection of documents in response to user string query, the links being generated based on an answer suggestion lookahead index. The answer suggestion lookahead index references a mapping between a plurality of groups of semantically equivalent terms and a respective link to specific content of the collection of documents. These techniques are useful for the generalized task of natural language question answering.

16 Claims, 17 Drawing Sheets

310

ADD TEXT

312

You can add text and shapes of different color, styles, and effects to an image. Use the Horizontal Type and Vertical Type tools to create and edit text. You can create single-line text or paragraph text.

322    320
About Text

Use the Horizontal Type (T) and Vertical Type (:T) tools to create and edit text. The new text you type is entered in a new text layer. You can create single-line text or paragraph text. Each line of single line text you enter is independent—the length of a line grows or shrinks as you edit it, but it doesn't wrap to the next line. To create a new line of text, press Enter. Paragraph text wraps within the paragraph boundaries you specify.

332
Add Text

1. From the toolbar, select the Horizontal Type tool or the Vertical Type tool .

2, Do one of the following:
 - To create a single line of text, click in the image to set an insertion point for the type.
 - To create paragraph text, drag a rectangle to create a textbox for the type.

The small line through the I-beam marks the position of the type baseline. For horizontal type, the baseline marks the line on which the type rests; for vertical type, the baseline marks the center axis of the type characters.

3. (Optional) Select type options, such as font, style, size, and color, in the tool options bar.

4. Type the characters you want. If you did not create a textbox, press Enter to create a new line. The text appears in its own layer. To view the layers, in the Expert mode, press F11.

5. Commit the text layer by doing one of the following:
 - Click the Commit button .
 - Press the Enter key on the numeric keypad.
 - Click in the image, outside the textbox.
 - Select a different tool in the toolbox.

```
                                                                    ┌─ 1600
                                                                    ↓
┌─────────────────────────────────────────────────────────────────────────────┐
│ {                                                                           │
│   "answer": {                                                               │
│   "answer_type": "procedure",                                               │
│   "answer_contents": {                                                      │
│     "title": "Adjust image color and tone with Curves"                      │
│     "source_url": "http://helpx.adobe.com/photoshop/using/curves-adjust..." │
│     "steps": [                                                              │
│        {"text": "To apply a Curves adjustment, do one of the following: Click the Curves icon in the ...."}, │
│        {"text": "(Optional) To adjust the color balance, in the Properties panel, choose the channel you want to adjust ..."}, │
│        {"text": "In the Properties panel, do any of the following: Click directly on the curve line and then drag ..."}] │
│ }                                                                           │
└─────────────────────────────────────────────────────────────────────────────┘
```

FIG. 16A

```
                                                                    ┌─ 1650
                                                                    ↓
┌─────────────────────────────────────────────────────────────────────────────┐
│ {                                                                           │
│  "answer": {                                                                │
│  "answer_type": "definition"                                                │
│  "answer_contents": {                                                       │
│         "term": "adjustment layer"                                          │
│         "similar_terms": ["adjustment-layer", "adjusting layer"]            │
│         "definition": "The Adjustment Layers in Photoshop are a group of a super useful, non-destructive image │
│ editing tools that add color and tonal adjustment to your image without permanently charging its pixels. ..." │
│ }                                                                           │
└─────────────────────────────────────────────────────────────────────────────┘
```

FIG. 16B

CONVERSATIONAL QUERY ANSWERING SYSTEM

TECHNICAL FIELD

This description relates to a query answering system that uses natural language processing (NLP).

BACKGROUND

Some search assistants can generate possible search strings as a user types words into a text box of the search assistant. For example, as a user types the question "How do I remove devil eyes," a search assistant may present a new set of search strings that anticipate the question. Specifically, in response to the user typing "How do I remove," the search assistant may present the string "How do I remove an app."

A conventional search assistant generates possible search strings based on a lookup operation performed on an aggregation of search strings submitted by a large population of users. For example, to generate possible search strings in response to a user typing "How do I remove," the search assistant looks up all possible search strings that contain the words "How do I remove." If the user types additional words in the text box, then the search assistant dynamically performs the lookup operation including the new word to produce a new set of search strings. In response to the user choosing a search string, the search assistant displays a set of search results based on standard search algorithms.

The conventional search assistant as described above has no way to return accurate search strings when the question typed by the user contains no words that exist in the aggregation of search strings. There have been attempts at a more intelligent search assistant which may be able to generate accurate search results in this case. Unfortunately, such attempts have had marginal success at best.

SUMMARY

In one general aspect, a method can include receiving document data representing a collection of documents, each document of the collection of documents including a respective topic and content pertaining to the topic. The method can also include generating answer suggestion lookahead index data based on the collection of documents, the answer suggestion lookahead index data representing a plurality of term/link pairs, each term/link pair of the plurality of term/link pairs including a semantically equivalent term and a corresponding link to content of the collection of documents. The method can further include receiving a user query string. The method can further include, in response to receiving the user query string, locating a semantically equivalent term of a term/link pair of the plurality of term/link pairs, the semantically equivalent term being located based a semantic equivalence to the user query string. The method can further include outputting a representation of the link of the located term/link pair to an output device.

The details of one or more implementations are set forth in the accompanying drawings and the description below. Other features will be apparent from the description and drawings, and from the claims.

BRIEF DESCRIPTION OF THE DRAWINGS

FIG. 3 is a diagram illustrating an example portion of a document of a collection of documents of a help system.

FIG. 7 is a flow chart illustrating an example process of generating a knowledge graph for a document based on the DOM for that document.

FIG. 16A is a diagram illustrating an example "how to" answer card in a JSON format.

FIG. 16B is a diagram illustrating an example "what is" answer card in a JSON format.

DETAILED DESCRIPTION

Figure 1:
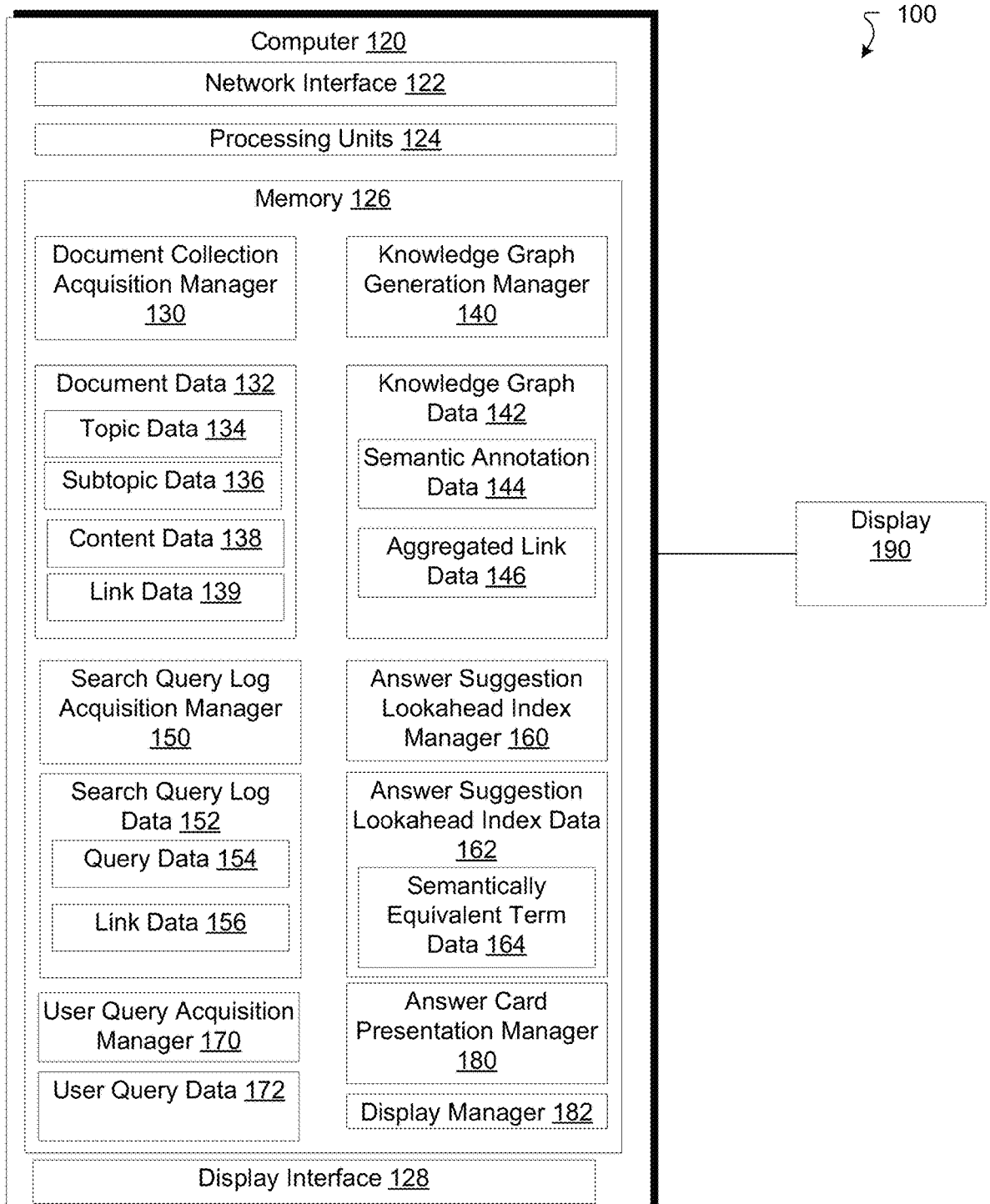
FIG. 1 is a diagram illustrating an example electronic environment in which improved techniques described herein may be implemented.

The above-described conventional search assistant is ill-suited as a help assistant for specific products and services. For example, a typical search assistant may require thousands or tens of thousands of dedicated servers that collect and aggregate search strings from the large population of users. Such a large number of servers may be very expensive to operate such that the cost is beyond the scope of most service providers. Moreover, in many instances, the number of possible search strings that contain the words typed into the text box may be large, with few or none of the search strings being relevant. And even when a search string is relevant, it is likely that the search results based on that search string will not address the question that the user had in mind.

For example, consider a scenario in which a user wants to remove red eyes from a digital photograph, but the user does not know the term "red eyes." Rather, the user types the following into a search assistant: "How do I remove devil eyes?" If this unusual way of expressing the query has never been expressed previously, then the search assistant may find a close match to the typed characters, as in "How do I remove evil eyes?" In this case, the search assistant may provide links to astrology and religious web sites that mention "the evil eye," none of which will help the user.

In accordance with the implementations described herein and in contrast to the above-described conventional search assistant, which requires an amount of server infrastructure that is too much for most enterprises and which frequently fails to answer questions as intended by users, an improved technique involves returning accurate search strings when the question typed by the user contains no words that exist in the aggregation of search strings. Specifically, the improved technique includes generating links to specific content in a collection of documents in response to a user string query, the links being generated based on an answer suggestion lookahead index. The answer suggestion lookahead index references a mapping between a group of semantically equivalent terms and a respective link to specific content of the collection of documents. In an example scenario, a computer receives a set of help documents pertaining to a product or a product family. Each help document includes a topic and content pertaining to the topic. The computer generates the answer suggestion lookahead index based on the set of help documents. Then, in response to receiving a user query, the computer generates a link to specific content in the set of help documents. In some implementations, the computer may also output an answer card corresponding to the link, the answer card being a window displayed on an output device in which the content answering the user's query is shown.

Advantageously, a user need not formulate their query precisely with the answer suggestion lookahead index. Whereas the conventional search assistant described above, which performs lookups based on words typed by the user, will most likely return links to content that has no relevance to the user's intent, the improved technique processes the input search string using a natural language processor. Accordingly, a help system based on the above-described mapping is very likely to produce a single result, e.g., link to a document in the collection—or to a location within a document—that precisely answers the user's query. Such a help system learns popular synonym terms without having to see billions of queries and can autosuggest answers based on question intent rather than literal keywords, is the latter being processed by conventional search assistants. The help system may also provide accurate answers in a compact answer card format, removing the need for users to have to rummage through result documents, removing the reliance on a massive and expensive search infrastructure, and providing the user with more confidence in the search result. The help system—known as "semantic lookahead"—can also dynamically generate a link as the user types their query, which allows a user to more quickly obtain a relevant search result than systems that merely output search results only after the full input has been entered.

To effect the above features, the system first generates a semantic document object model (DOM) for each content page to capture topical relationships and descriptions. The system then constructs a knowledge graph from the assembled DOM and leverages discovered parent/child topic relationships, how-to procedures, and related topics within the DOM structure. The system exploits highly useful topic structure and domain information through a document understanding process before constructing its final question/answer fact knowledge graph.

Further, documentation for highly competitive products of a proprietary nature (e.g., the documentation for sensitive government, pharmaceutical, scientific content, or legal applications) cannot be accessed by large public search engines. For such documentation, it is desired to have the ability to deploy an intelligent question answering system locally and entirely within a single enterprise or across a federated enterprise environment. The improved techniques, taking in a collection of documents as input, specifically provide such ability.

Another advantageous feature is the above-described system is a process for automatically learning answer indexing weights from example question/answer pairs using machine learning techniques and an optimizing argmax( ) function These answer indexing weights form a backbone of the semantic lookahead help system described above in that various portions of a user input (e.g., subject, predicate, title) are weighted in importance with respect to locating semantic equivalents to those portions of the user input in the knowledge graph. This allows the system to rapidly generate accurate answer proposals by directly using product help search query logs from a smaller purpose-driven audience. The answer indexing weights completely distinguish over techniques used in the conventional search assistants, as such conventional search assistants have no capacity for semantic lookahead as described herein. Rather, any "lookahead" achieved by the conventional search assistants is used in the context of finding exact matches of words in an input string with words in a search database.

In summary, the improved techniques described herein are directed to fast, accurate search results based on imprecise user input. These search results are built by constructing a knowledge graph based on an indexing of content in a collection of documents, i.e., semantic lookahead data. The indexing of the content may be performed by an appropriate weighting of various portions of a search string as described above and is suited for returning search results in real time as the user types; this is a semantic lookahead of a user input string. The knowledge graph thus constructed includes pairs of semantically equivalent terms and links to content in the collection of documents. In this way, a user may make an imprecise formation of a search string and obtain relevant search results while the search string is being input.

In some implementations, generating the answer suggestion lookahead index data includes generating topic knowledge graph data based on the collection of documents, the topic knowledge graph data representing a topic knowledge graph that includes (i) a respective topic and a set of subtopics of each of the collection of documents, and (ii) links to the content of the collection of documents, each of the links corresponding to one of a respective topic or subtopic of the set of subtopics of each of the collection of documents.

In some implementations, generating the answer suggestion lookahead index data includes generating semantic annotation data representing respective semantic annotations to the topic and set of subtopics of each of the collection of documents, each of the semantic annotations including a respective predicate of a set of predicates and a respective object of a set of objects; identifying, for each of the set of predicates, at least one object of the set of objects that, when combined with that predicate, correspond to one of a topic or a subtopic of the set of subtopics of each of the collection of documents; and identifying, for each of the set of objects, at least one predicate of the set of predicates that, when combined with that object, correspond to one of a topic or a subtopic of the set of subtopics of each of the collection of documents.

In some implementations, generating the topic knowledge graph data includes for each of the collection of documents, generating a respective document object model (DOM) of a set of DOMs, the respective DOM corresponding to that document, the DOM corresponding to that document including the topic, the set of subtopics, and the links to the content of that document; and performing an aggregation operation on the set of DOMs to produce a master link list for the topic knowledge graph, the master link list including a plurality of unique links to content of the collection of documents.

In some implementations, generating the topic knowledge graph data includes for each of the collection of documents, generating a respective document object model (DOM) of a set of DOMs, the respective DOM corresponding to that document, the DOM corresponding to that document including the topic, the set of subtopics, and the links to the content of that document; and performing a knowledge graph formatting operation on the set of DOMs to produce an aggregate flattened knowledge graph formatted for a natural language processing (NLP) pipeline, the aggregate flattened knowledge graph including each of the topic and set of subtopics of each of the set of DOMs, the NLP pipeline being configured to produce <S,P,O> triplets consisting of subject, predicate, and object for each of the topic and set of subtopics of each of the set of DOMs.

In some implementations, generating the topic knowledge graph data includes performing a splitting operation on the aggregate flattened knowledge graph to produce a plurality of aggregate flattened knowledge graph parts; and performing a NLP operation by the NP pipeline on each of the plurality of aggregate flattened knowledge graph parts to produce the knowledge graph, the MLP operation being performed on each of the plurality of aggregate flattened knowledge graph parts in parallel.

In some implementations, generating the DOM of the set of DOMs includes performing a discovery operation on each of the collection of documents to identify non-informative content of that document; and performing a removal operation on the non-informative content of that document to produce the topic, the set of subtopics, and the links to the content of that document, the removal operation including a term frequency inverse document frequency (TF-IDF) algorithm applied to that document.

In some implementations, generating the DOM of the set of DOMs includes performing a reformatting operation on each of the collection of documents to produce the document formatted in a Markdown Markup language (MDML).

In some implementations, generating the answer suggestion lookahead index data includes obtaining search query log data, the search query log data representing a mapping between user query data and links to content of the collection of documents, the user query data representing a plurality of user queries; and performing a text mining operation on the search query log data to produce a set of common user queries for one of a topic or a respective subtopic of a set of subtopics of a document of the collection of documents, each of the topic and set of subtopics being associated with respective content corresponding to a respective link.

In some implementations, generating the answer suggestion lookahead index data includes forming pairs of (i) a respective user query of the set of common user queries and (ii) a respective link to content of the collection of documents, each pair based on annotated topics and sets of subtopics of the topic knowledge graph, the annotated topics and sets of subtopics including topic titles and <S,P,O> triplets consisting of subject, predicate, and object for each of the topics and sets of subtopics. In such implementations, producing the link to specific content in the collection of documents includes identifying a pair of a user query and a link to the content that is a semantic best match to the predicate and object to a predicate and object of the received user query string.

In some implementations, forming the pairs of user query and link to the content includes generating a respective weight corresponding to each of a topic title, a subject, a predicate, and textual content corresponding to the topic title of the pairs of the user query and the link to the content. In such implementations, identifying the pair of the user query and the link to the content that is a semantic best match to the predicate and object to a predicate and object of the received user query string includes generating a linear combination of the topic title, the subject, the predicate, and the textual content using the respective weight corresponding to each of the topic title, the subject, the predicate, and the textual content of the set of common user queries that most closely matches the same linear combination of a topic title, a subject, a predicate, and textual content corresponding to the user query string.

In some implementations, generating the respective weight corresponding to each of the topic title, the subject, the predicate, and the textual content corresponding to the topic title of the pairs of the user query and the link to the content includes generating a matrix having a plurality of rows, each of the plurality of rows having elements equal to a respective weight of the topic title, the subject, the predicate, and the textual content; for each of the pairs of user query and link to the content of the set of common user queries, forming a merit function that takes as arguments (i) a search function of the user query data, the links to content of the collection of documents, and a row of the matrix, and (ii) a particular link to content of the collection of documents, the search function returning a link as an output, the merit function having a value of one in response to the link output of the search function being equal to the particular link and a value of zero in response to the link output of the search function not being equal to the particular link; and identifying, as the weight corresponding to each of the topic title, the subject, the predicate, and the textual content, the row of the matrix that causes the merit function to take on a maximum value.

In some implementations, obtaining the search query log data includes performing a machine learning operation on raw search query data to produce the mapping between the user query data and the links to content of the collection of documents.

In some implementations, the knowledge graph further includes, for a topic, links to content corresponding to other topics.

In some implementations, the set of links includes a single link. In such implementations, outputting the set of links to the output device includes displaying an answer card corresponding to the single link, the answer card including a window in which the content corresponding to the link is contained.

In some implementations, producing the link to specific content in the collection of documents includes locating content that includes text indicating a step of a process; and identifying the topic to which the content corresponds.

FIG. 1 is a diagram that illustrates an example electronic environment 100 in which the above-described improved techniques may be implemented. As shown, in FIG. 1, the electronic environment 100 includes a computer 120 and a display 190 viewed by a user 192.

The computer 120 is configured to display user-specified drawings on a display device. The computer 120 includes a network interface 122, one or more processing units 124, memory 126, and a display interface 128. The network interface 122 includes, for example, Ethernet adaptors, Token Ring adaptors, and the like, for converting electronic and/or optical signals received from a network to electronic form for use by the editing computer 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some embodiments, one or more of the components of the computer 120 can be, or can include processors (e.g., processing units 124) configured to process instructions stored in the memory 126. Examples of such instructions as depicted in FIG. 1 include a document collection acquisition manager 130, a knowledge graph generation manager 140, a search query log acquisition manager 150, an answer suggestion lookahead index manager 160, a user query acquisition manager 170, an answer card presentation manager 180, and a display manager 182. Further, as illustrated in FIG. 1, the memory 126 is configured to store various data, which is described with respect to the respective managers that use such data.

The document collection acquisition manager 130 is configured to obtain document data 132 representing a collection of documents including content that may be presented to a user having access to the collection of documents. In some implementations, the document collection acquisition manager 130 obtains the documents data 132 via a network connection using the network interface 122. In some implementations, document collection acquisition manager 130 obtains the documents data 132 via storage media (e.g., a disk drive, a flash drive, etc.).

The document data 132 represents the collection of documents to be searched in response to a user query. In some implementations, the collection of documents includes help documentation for a product or family of products. In some implementations, the collection of documents includes documents that form a private intranet for an enterprise. The document data 132 includes topic data 134, content data 138, and link data 139. In some implementations, the document data 132 includes subtopic data 136.

The topic data 134 represents topic titles. Each document of the collection of documents includes a topic title that indicates subject matter disclosed in that document, and content pertaining to the topic title.

The subtopic data 136 represents a set of subtopic titles of each of the set of documents. Each of the set of subtopics of a document pertains to the topic of the document. Moreover, a portion of the content of the document pertains to a respective subtopic of the set of subtopics of the document.

The content data 138 represents various content included in each of the collection of documents, pertaining to the topic represented by the topic data 134 and the set of subtopics represented by the subtopic data 136. In some implementations, the content includes textual descriptions. In some implementations, the content includes other media such as graphic media, video media, audio media, and the like.

The link data 139 represents links to the content that may be accessed by a browser or a search engine according to the improved techniques described herein. In some implementations, the links include a uniform resource locator (URL) address at which a document is stored (e.g., a web server, not necessarily the computer 120). In some implementations, the links also include an anchor that indicates a place within the document at which content of interest pertaining to a subtopic is located.

The knowledge graph generation manager 140 is configured to generate knowledge graph data 142 based on the document data 132. The operation of the knowledge graph generation manager 140 is described in detail with regard to FIGS. 4-12.

The knowledge graph data 142 represents a knowledge graph. The knowledge graph is a hierarchal arrangement of topic, subtopics, and links that also includes information about semantic content of the textual content of the collection of documents and their relation to the links by which the content may be accessed. The knowledge graph data 142 includes semantic annotation data 144 and aggregated link data 146.

The semantic annotation data 144 represents grammatical parts of the topic and subtopic titles and textual content extracted by a natural language processor (NLP). For example, a NLP may extract a subject, predicate, and object (a <S,P,O> triple) from a topic title. As a specific instance, consider the topic title "Use the text on shape tool." The predicate may be "use" and the object may be "text" or "text on shape tool." The subject, while not explicitly stated in the imperative format, may be deduced to be "you" or "user." The knowledge graph generation manager 140 is configured to arrange the output of an NLP into a semantic annotation file for reference by the search engine.

The aggregated link data 146 represents all of the links to topics and subtopics in the collection of documents (i.e., document data 132). The knowledge graph generation manager 140 is configured to extract and aggregate these links, eliminating duplicates and generating an indexing scheme by which the links are referred in the knowledge graph.

The search query log acquisition manager 150 is configured to obtain search query log data 152. In some implementations, the search query log acquisition manager 150 obtains the search query log data 152 via a network connection using the network interface 122. In some implementations, the search query log acquisition manager 150 obtains the search query log data 152 via storage media (e.g., a disk drive, a flash drive, etc.).

The search query log data 152 represents a search query log generated by users searching through the collection of documents. For example, some users enter a query, and in response, click on a link offered by a search engine. Some users, in response, may not find a helpful link and may take another action such as trying another query or not clicking on any link whatsoever. The search query log data 152 includes query data 154 and link data 156.

The query data 154 represents queries input by multiple users in attempts to find content in the collection of documents. In some implementations, the query data 154 takes the form of a string of characters formed into discrete words, as typically expressed in a search query. The search query log acquisition manager 150 collects queries input into the search engine by users and stores them in a central log. In some implementations, the search query log acquisition manager 150 formats the collected queries for natural language processing to extract semantic information such as <S,P,O> triples from the queries. Storing the queries in such a semantic form provides a connection between the queries and the knowledge graph.

The link data 156 represents links selected in response to a query. The links include a URL that indicates a location (e.g., on a remote web server) where the documents are stored. Each link corresponds to a topic that defines the content of a document. In some implementations, the links include anchors corresponding to locations of subtopics in the documents. For example, an anchor may be denoted by a "#" symbol followed by characters in the subtopic after a URL in a link.

The answer suggestion lookahead index manager 160 is configured to produce answer suggestion lookahead index data 162 based on the knowledge graph data 142 and the search query log data 152. The answer suggestion lookahead index data 162 represents an answer suggestion lookahead index that provides a user with a link or a set of links to content of the collection of documents in response to a query input by the user. Because the knowledge graph data 142 and the search query log data 152 have semantic annotations (e.g., <S,P,O> triples), the user queries do not need to include keywords in the topic titles or associated content. Rather, the answer suggestion lookahead index data 162 provides topics and subtopics semantically related to the query input. The answer suggestion lookahead index data 162 includes semantically equivalent term data 164.

The semantically equivalent term data 164 represents phrases found to be semantically equivalent in that they are known to be associated with the same links. For example, the phrases "remove red eye," "filter reflections from eyes in pictures," and "eliminate red eyes" may all be associated with the link to the topic "How to remove red eyes from photographs." Each of the phrases as well as the topic have semantic annotations that have been analyzed with respect to the semantic annotations of the topic title. By analyzing the semantic content of new input queries such as "How do I remove the devil eyes," the answer suggestion lookahead index manager 160 is able to display the link to the user even though the query includes words not in the search query log.

The user query acquisition manager 170 is configured to obtain user query data 172 that represents user queries from a search engine. In some implementations, the user query acquisition manager 170 is configured to extract semantic content (e.g., <S,P,O> triples) from user queries.

The answer card presentation manager 180 is configured to display content in an answer card in response to there being only a single link presented in response to a query, or the user selecting a link from multiple links presented. The answer card is a window specifically configured for presenting such content. In some implementations, the answer cards may take different forms depending on whether the associated topic is a "how to" topic or a "what is" topic.

The display manager 182 is configured to send content, in some implementations within an answer card, to the display device 190.

The components (e.g., modules, processing units 124) of the computer 120 can be configured to operate based on one or more platforms (e.g., one or more similar or different platforms) that can include one or more types of hardware, software, firmware, operating systems, runtime libraries, and/or so forth. In some implementations, the components of the computer 120 can be configured to operate within a cluster of devices (e.g., a server farm). In such an implementation, the functionality and processing of the components of the computer 120 can be distributed to several devices of the cluster of devices.

The components of the computer 120 can be, or can include, any type of hardware and/or software configured to process attributes. In some implementations, one or more portions of the components shown in the components of the computer 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the computer 120 can be, or can include, a software module configured for execution by at least one processor (not shown). In some implementations, the functionality of the components can be included in different modules and/or different components than those shown in FIG. 1.

In some embodiments, one or more of the components of the computer 120 can be, or can include, processors configured to process instructions stored in a memory. For example, an document collection acquisition manager 130 (and/or a portion thereof), a knowledge graph generation manager 140 (and/or a portion thereof), a search query log acquisition manager 150 (and/or a portion thereof), an answer suggestion lookahead index manager 160 (and/or a portion thereof), a user query acquisition manager 170 (and/or a portion thereof), an answer card presentation manager 180 (and/or a portion thereof), and a display manager 182 (and/or a portion thereof) can be a combination of a processor and a memory configured to execute instructions related to a process to implement one or more functions.

In some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the editing computer 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the editing computer 120. As illustrated in FIG. 1, the memory 126 is configured to store various data, including document data 132, knowledge graph data 142, search query log data 152, semantically equivalent term data 162, and user query data 172.

Figure 2:
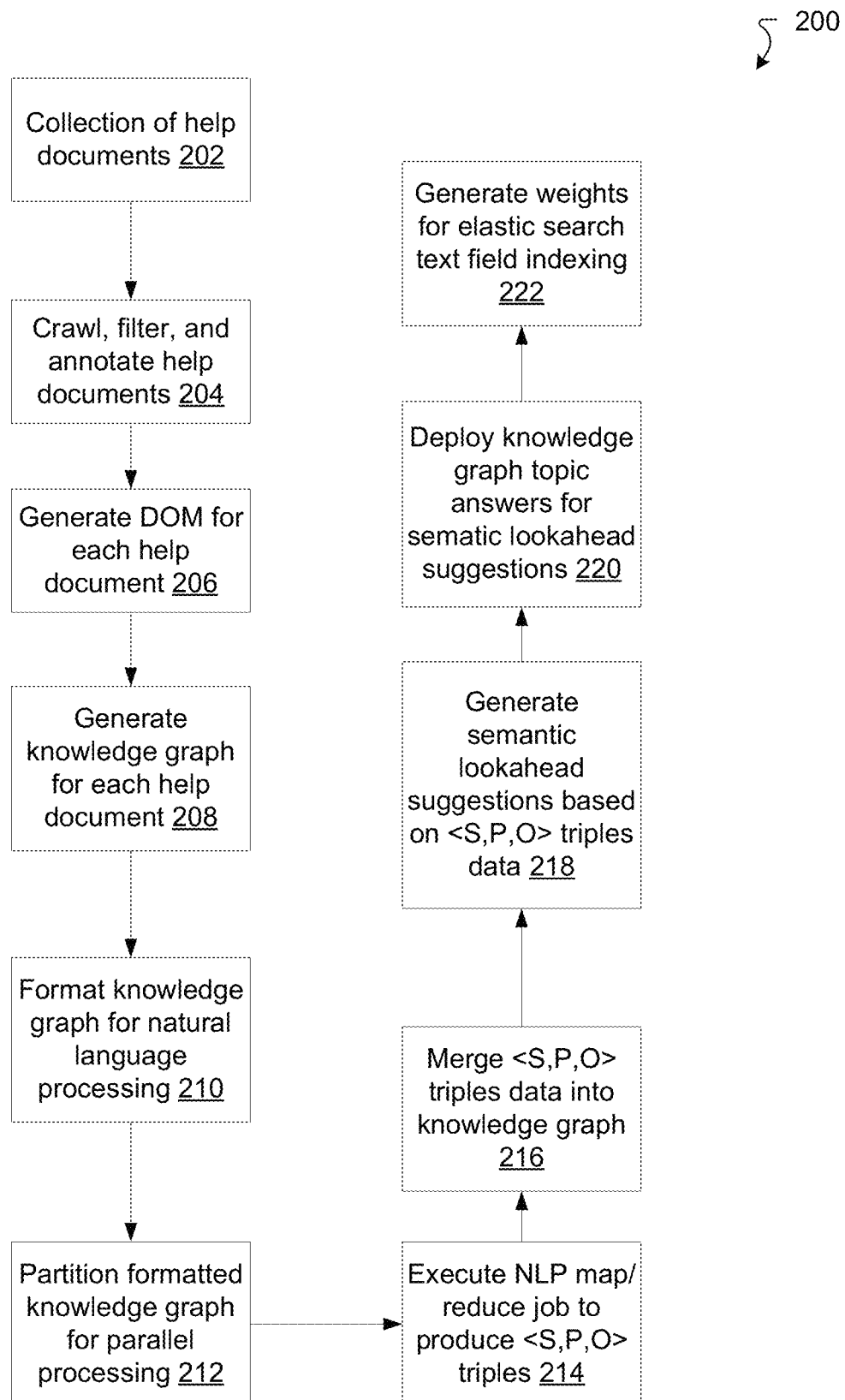
FIG. 2 is a flow chart illustrating an example method of building the semantic lookahead engine for the search assistance according to the improved techniques.

FIG. 2 is a flow chart depicting an example process 200 of creating a semantic lookahead index for queries of content in a collection of documents. The process 200 is described for a collection of help documents in a help system, but the process 200 may be applied to any collection of documents such as an enterprise intranet. The process 200 may be performed by software constructs described in connection with FIG. 1, which reside in memory 126 of the computer 120 and are run by the set of processing units 124.

At 202, the document collection acquisition manager 130 obtains a collection of help documents.

At 204, the knowledge graph generation manager 140 crawls, filters, and annotates the help documents to produce a collection of documents formatted in a markdown/markup language (MDML), filtered of irrelevant text. Further details of such a filtering and annotation of the help documents is described in further detail with regard to FIG. 4.

At 206, the knowledge graph generation manager 140 generates a documents object model (DOM) for each help document of the collection of documents. As described with regard to FIGS. 5 and 6, the DOM for a document is a collection of topics, subtopics, and links to the content associated with the topics and subtopics.

At 208, the knowledge graph generation manager 140 generates a knowledge graph for each help document, i.e., corresponding to a topic from a DOM for the document associated with the topic. As described with regard to FIG. 7, the knowledge graph refers to an aggregated index of links to content in the document associated with the topic as well as the content itself and links to other topics that may have some association with the topic.

At 210, the knowledge graph generation manager 140 forms a serialized knowledge graph for the collection of help documents. The serialized knowledge graph is formatted for input into a NLP pipeline.

At 212, the knowledge graph generation manager 140 partitions the serialized knowledge graph into multiple files for input into the NLP pipeline. The NLP pipeline may then perform natural language processing on each of the partitions in parallel.

At 214, the NLP pipeline executes a map/reduce operation on each partition to produce <S,P,O> triples for each sentence in the partition.

At 216, the knowledge graph generation manager 140 merges the <S,P,O> triples into the serialized knowledge graph. By merging, a semantic annotation file is linked to the serialized knowledge graph so that each sentence is associated with its triple.

At 218, the answer suggestion lookahead manager 160 generates semantic lookahead suggestions based on the serialized knowledge graph with the semantic annotations.

At 220, the answer suggestion lookahead manager 160 deploys knowledge graph topic answers for semantic lookahead suggestions.

At 222, the answer suggestion lookahead manager 160 generates weights for an elastic search text field indexing. The weights are computed to maximize the likelihood that a user query results in a link and/or answer card that precisely addresses the intent of the query.

FIG. 3 is a diagram illustrating an example help document 202 to be processed as part of an answer suggestion lookahead index. The help document 202 as illustrated in FIG. 3 has a topic title 310 ("ADD TEXT") that defines the content in the document. The topic title 310 in this case has a simple predicate ("add") and a simple object ("text") and describes a feature or a family of features in a software tool. The document 202 describes a "how to" help scenario.

Below the topic title 310 is textual content 312 corresponding to the topic title 310. The textual content 312 includes sentences describing the feature or set of features. These sentences, as well as the topic title 310, will be reformatted for and processed by a NLP pipeline so that the semantic structure of the topic 310 and content 312 may be normalized into a common platform, e.g., <S,P,O> triples.

Below the content 312 is a subtopic title 320, which reads "About Text." The subtopic 320 title is related to the topic title 310 and may be linked to using an anchor, e.g., a "#" followed by characters identifying the place in the document 202 at which the subtopic title is placed. There is also textual content 322 corresponding to the subtopic title 320. The textual content 322, like the textual content 312, includes sentences that will be reformatted for and processed by a NLP pipeline so that the semantic structure of the topic 310 and content 312 may be normalized into a common platform, e.g., <S,P,O> triples.

The document 202 also has another subtopic title ("Add Text") and textual content 332 corresponding to that subtopic title. In this case, the textual content 332 includes enumerated steps in a "how to" process. A NLP pipeline processing operation may identify the sentences as steps and format an answer card that includes this text accordingly.

Figure 4:
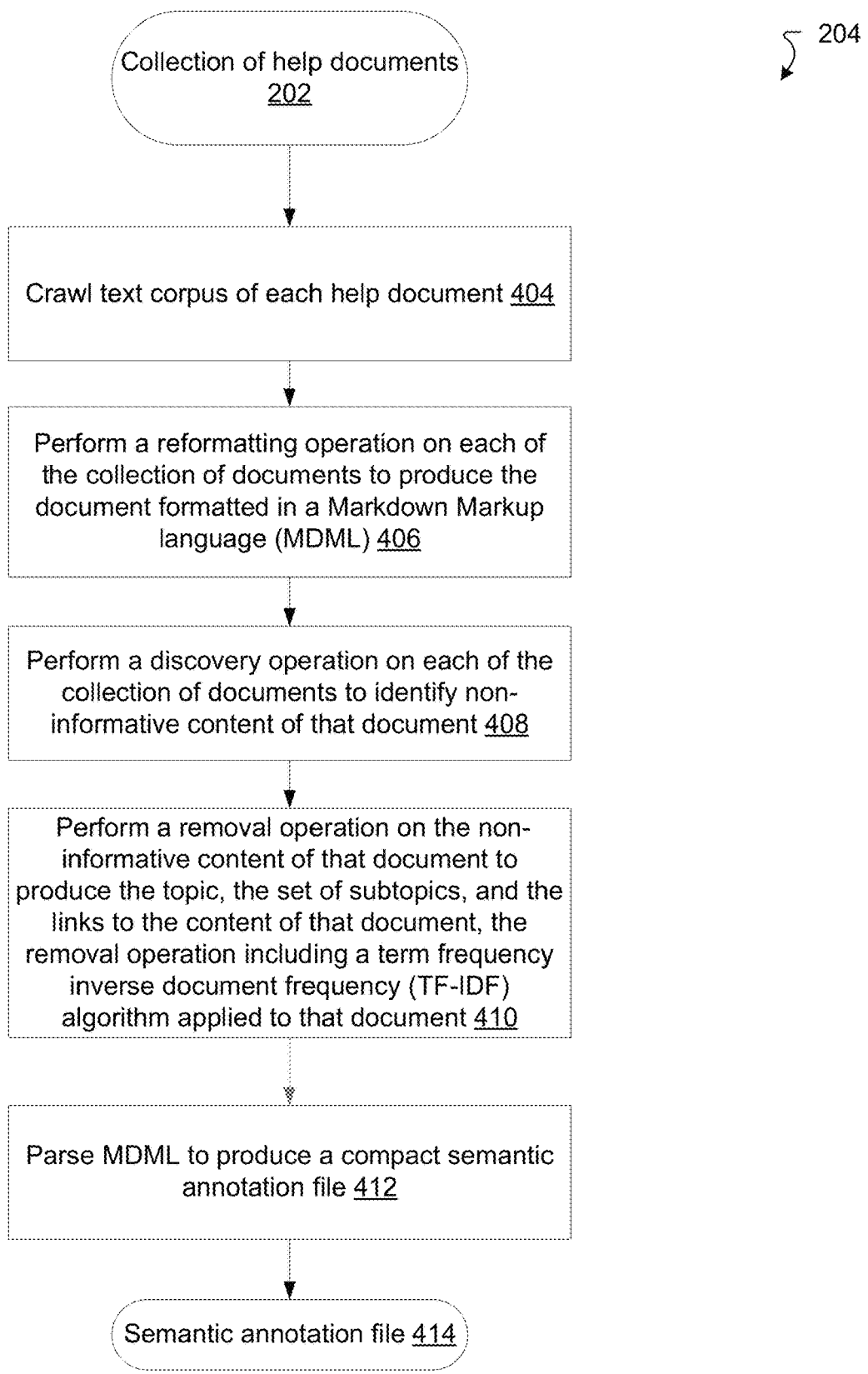
FIG. 4 is a flow chart illustrating an example process of generating a semantic annotation file.

FIG. 4 is a flow chart depicting details of the process 204 of creating a semantic annotation file from a collection of help documents 202. The semantic annotation file 412 is used to extract topic, subtopic, and link information for a semantic lookahead index used in identifying and presenting answer cards in response to a user query. The process 204 may be performed by software constructs described in connection with FIG. 1, which reside in memory 126 of the computer 120 and are run by the set of processing units 124.

At 404, the knowledge graph generation manager 140 performs a crawling operation on each of the collection of documents 202 to identify a textual corpus to be eventually organized in a knowledge graph.

At 406, the knowledge graph generation manager 140 performs a reformatting operation on each of the collection of documents in a markdown markup language (MDML) to produce a collection of formatted documents. The MDML is a lightweight markup language that is human-readable and convertible to a standard markup language such as XHTML or Rich Text Format (RTF).

At 408, the knowledge graph generation manager 140 performs a discovery operation on the extracted textual corpus of each of the collection of formatted documents to identify non-informative content in that document. To accomplish this, the knowledge graph generation manager 140 acquires (e.g., learns) a model to filter out such content. Examples of such language include legal disclaimer language and contact information.

At 410, the knowledge graph generation manager 140 performs a filtering, or removal, operation on the identified non-information content of each of the collection of formatted documents. In some implementations, a model for filtering out such content from the textual corpus is a term frequency inverse document frequency (TF-IDF) algorithm. In some implementations, the knowledge graph generation manager 140 computes an inverse document frequency (IDF) of the textual corpus:

$$idf(t,D) = \log N/|\{d \in D : t \in d\}|'$$

where t is a candidate noise term (i.e., an N-gram, e.g., "Contact company support"), and N=|D| is a total number of documents of the collection of documents. The term in the denominator, $|\{d \in D : t \in d\}|$, is a number of documents where the candidate noise term t appears, i.e., a nonzero term frequency.

The filtering process then includes the following: (i) collect and sort M candidate noise terms using the above expression for idf(t, D); (ii) generalize terms with regular expressions for variant parts, e.g., ((TERM$_1$|TERM$_2$| . . . |TERM$_i$| . . . |TERM$_N$)+[ ]*)[[0-9]+\]; (iii) collect term patterns in noise term stop list; and (iv) apply encountered terms from parsing documents of the collection of documents and, if found, remove term pattern from annotation.

At 412, the knowledge graph generation manager 140 performs a parsing operation on each of the each of the collection of formatted documents to identify topic titles, subtopics, textual descriptions, and links. The parsing operation produces a semantic annotation file 414 that organizes the identified topic titles, subtopics, textual descriptions, and links for reference by a suggestion semantic lookahead index. In some implementations, the knowledge graph generation manager 140 uses a Beautiful Soup package to produce a parsing tree for identification of the topic titles, subtopics, textual descriptions, and links.

Figure 5:
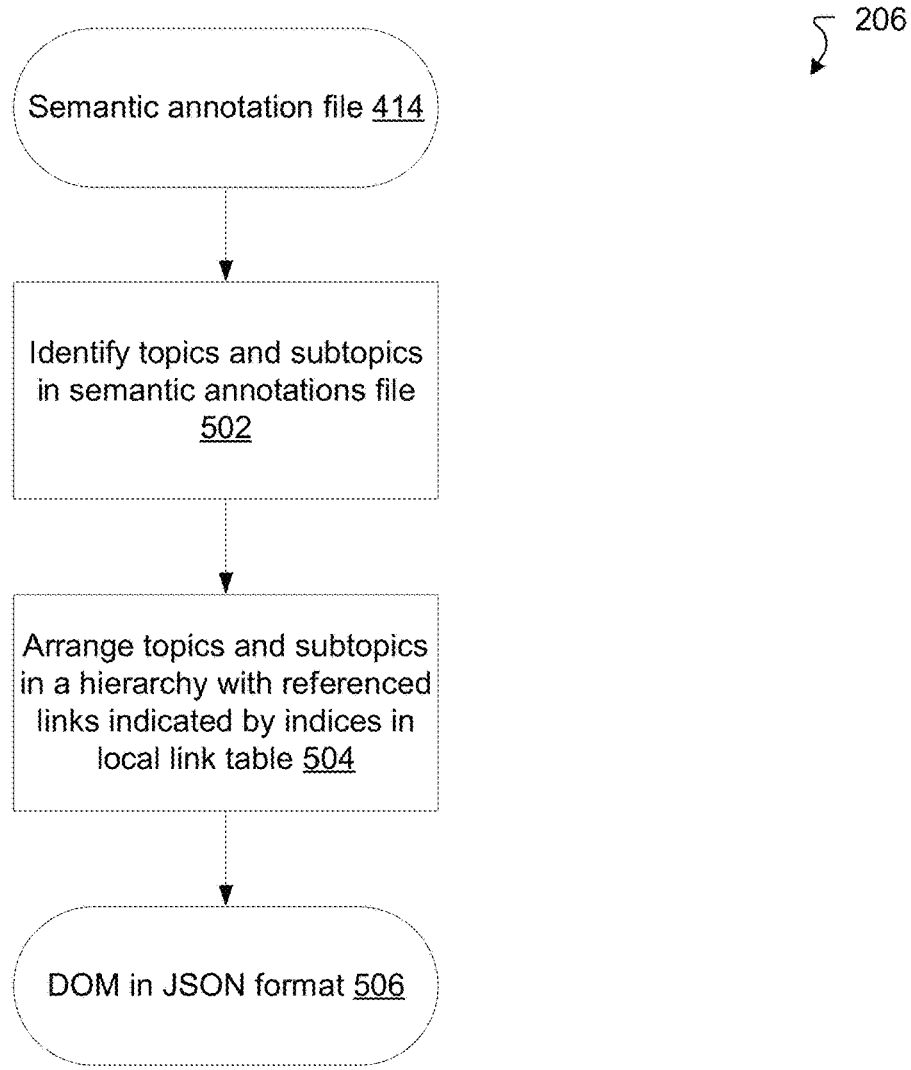
FIG. 5 is a flow chart illustrating an example process of generating a document object model (DOM) from a semantic annotation file.

FIG. 5 is a flow chart depicting details of the process 206 of creating a set of document object models (DOMs) from the semantic annotation file 414. Each DOM includes the top-level topic and related subtopic. The process 206 may be performed by software constructs described in connection with FIG. 1, which reside in memory 126 of the computer 120 and are run by the set of processing units 124.

At 502, the knowledge graph generation manager 140 identifies the topics and subtopics the semantic annotations file 414 associated with each of the collection of documents 202.

At 504, the knowledge graph generation manager 140 arranges the identified topic and subtopics from each of the collection of documents 202 into a DOM 506. The DOM corresponding to a document of the collection of documents 202 has a hierarchal organization of a topic and subtopics. In some implementations, the DOM 506 is represented in a recursive JSON format.

Figure 6:
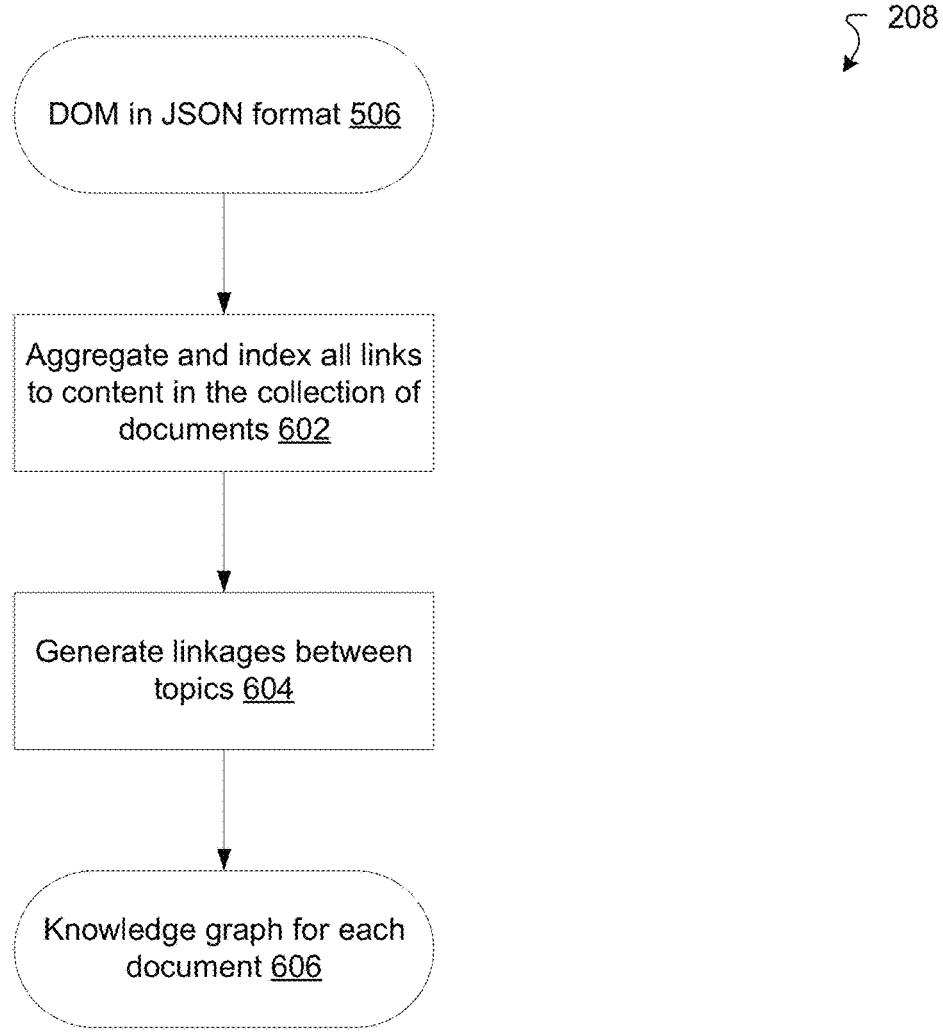
FIG. 6 is a diagram illustrating an example DOM for a document of the collection of documents.

FIG. 6 is a flow chart depicting details of the process 208 of creating a collection of document knowledge graphs (KGs) from each DOM corresponding to a respective document of the collection of documents. Each document KG includes link identifiers identifying links to content in each of the collection of documents. The process 208 may be performed by software constructs described in connection with FIG. 1, which reside in memory 126 of the computer 120 and are run by the set of processing units 124.

At 602, the knowledge graph generation manager 140 aggregates and indexes the links identified in the semantic annotation file 414. In aggregating the links, the knowledge graph generation manager 140 identifies redundant (e.g., nonunique) links and removes them from a master reference list of links. From this master list, the knowledge graph generation manager 140 generates a common index of the links from the master reference list.

At 604, the knowledge graph generation manager 140 generates linkages between topics. In this way, the KG corresponding to a topic corresponding to a document may provide a list of links to other topics. In this way, the knowledge graph generation manager 140 produces a document KG 606 from each DOM using the index of links.

Figure 7:
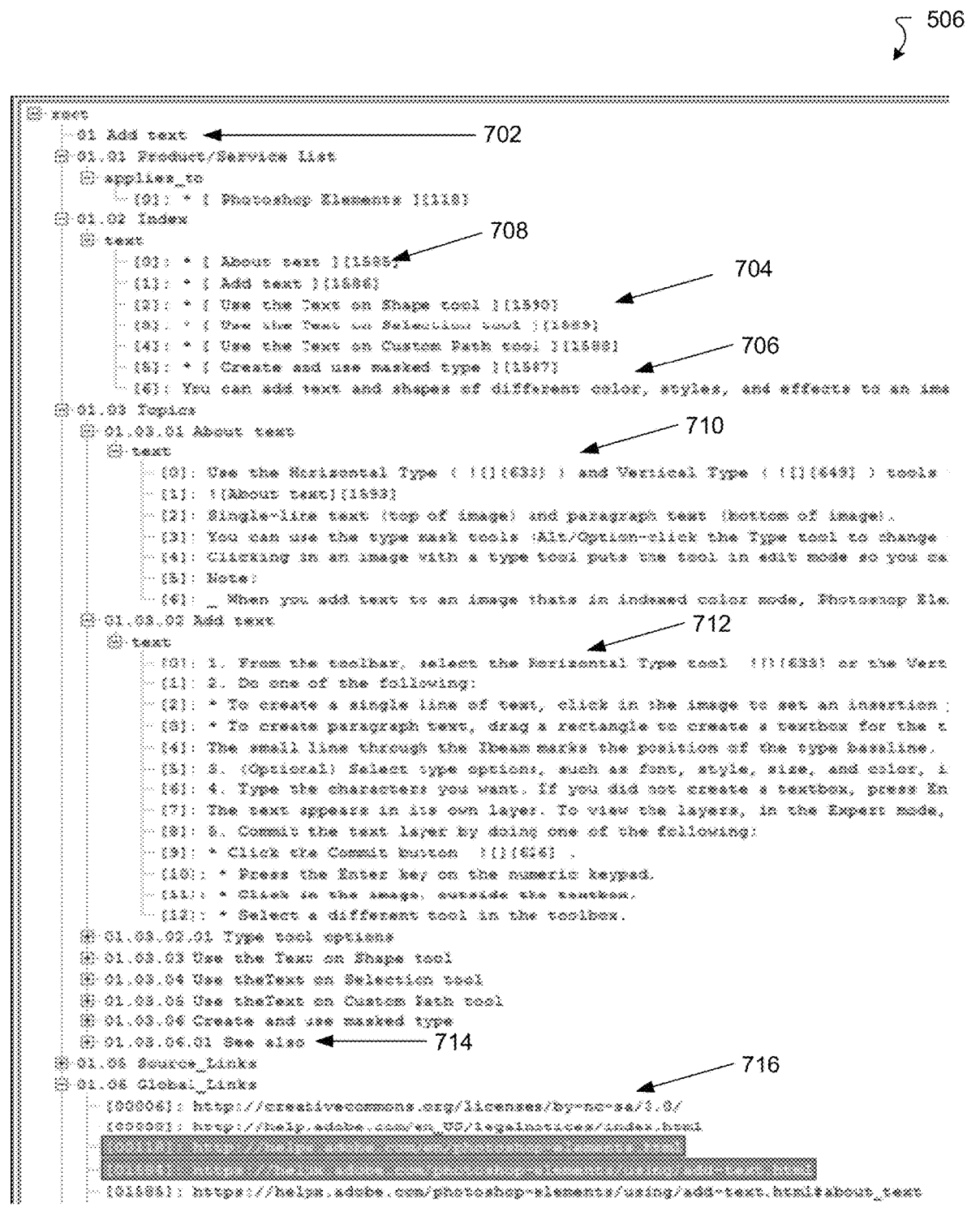

FIG. 7 is a diagram illustrating an example DOM 506 in a JSON format. As shown in FIG. 7, the DOM lists the topic title 702 ("Add text') at the top of the hierarchy. Further down the hierarchy are the subtopics 704, e.g., "About text," "Add text," "Use the Text on Shape Tool," and so on. At the same hierarchal level as the subtopic 704 is a textual description 706 of the topic (which corresponds to the textual content 312 in FIG. 3).

Included with each subtopic 704 is a link reference 708, e.g., "1585" with the "About text" subtopic, and so on. Each link reference 708 is taken from the common index of the links and corresponds to a link that produces the subtopic.

The textual descriptions of the subtopics are shown at 710 ("About text") and at 712 ("Add Text"). Each row of the textual description corresponds to a step in the process described in the corresponding document of the collection of documents 202. Further, some of the rows of the textual descriptions include link references (e.g., "633" in line [0] of the subtopic 710 textual description). These link references correspond to actual links in the respective document of the collection of documents 202.

There is a "See also" entry 714 to other topics. Upon expansion of the entry 714, one may observe links to other topics and subtopics in other documents of the collection of documents 202. Also, at 716, there is a listing of global links to other content not included in the collection of documents 202.

Figure 8:
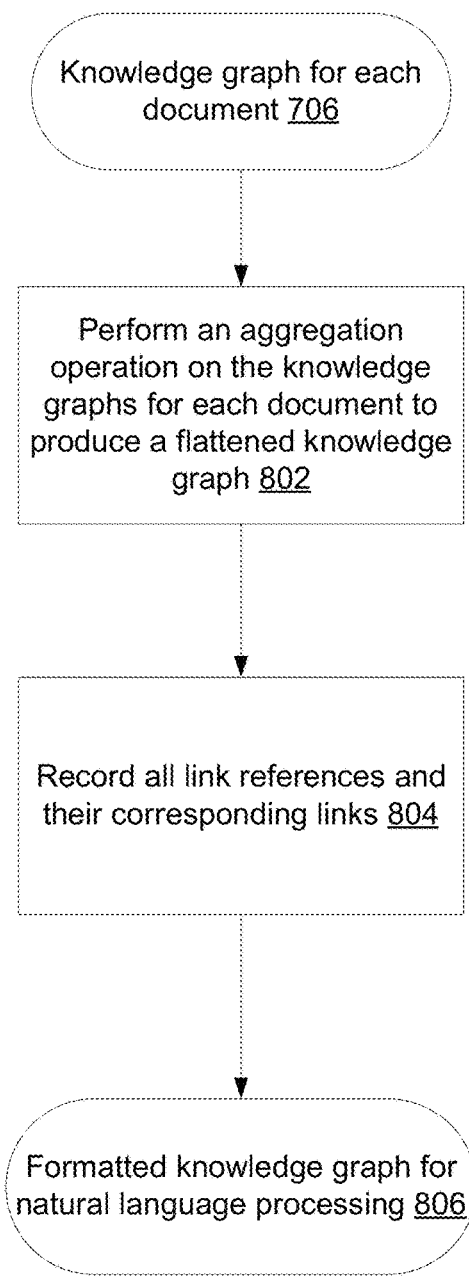
FIG. 8 is a flow chart illustrating an example process of generating a knowledge graph formatted for a natural language processing (NLP) pipeline.

FIG. 8 is a flow chart depicting details of the process 210 of creating a formatted KG for natural language processing (NLP). The process 210 may be performed by software constructs described in connection with FIG. 1, which reside in memory 126 of the computer 120 and are run by the set of processing units 124.

At 802, the knowledge graph generation manager 140 performs an aggregation operation on the KGs for each document of the collection of documents 202 to produce a flattened KG 806. The flattened, or serialized, KG 806 is arranged in a format suitable for submission to a NLP pipeline. Such an NLP pipeline would parse each topic textual description (e.g., textual description 706) and then perform a semantic identification and extraction (e.g., <S,P, O> generation) from the textual description.

Rather

At 804, the knowledge graph generation manager 140 records all link references and corresponding links (i.e., URLs and link anchors). This recording will allow search results received from a user to take the user directly to the relevant content in a document of the collection of documents 202. In some implementations, the references and links are recorded in a JSON format.

Figure 9:
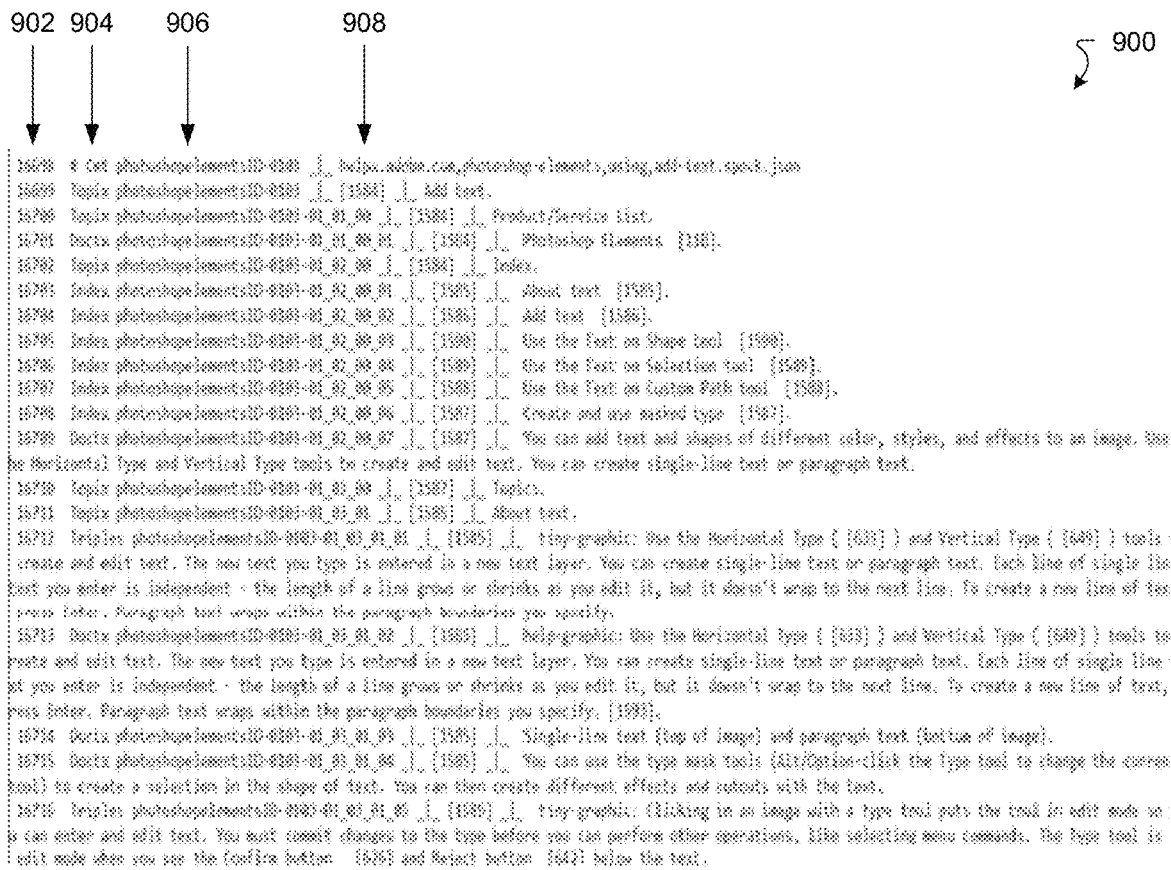
FIG. 9 is a diagram illustrating an example portion of a formatted knowledge graph.

FIG. 9 is a diagram illustrating a portion 900 of an example flattened KG 806 as described above with regard to FIG. 8. This portion may be compared with the DOM 506 in a JSON format shown in FIG. 7. As shown in FIG. 9, the flattened KG 806 lists each topic title, subtopic, and textual description on separate lines. Each line has a reference numeral 902 in place of a hierarchal arrangement in a JSON format.

The flattened KG 806 also has indicators 904 that indicates whether a line in the flattened KG 806 is of type "Topix," "Doctx," "Triples," or "Index." The type "Topix" refers to lines associated with the topic title. ""Doctx" refers to lines associated with textual content. "Triples" refers to lines associated with associated with textual content that will be parsed for semantic content. "Index" refers to lines associated with subtopics.

The flattened KG 806 also has hierarchal DOM paths 906 corresponding to a DOM structure of a document of the collection of documents 202 and link references 908.

Figure 10:
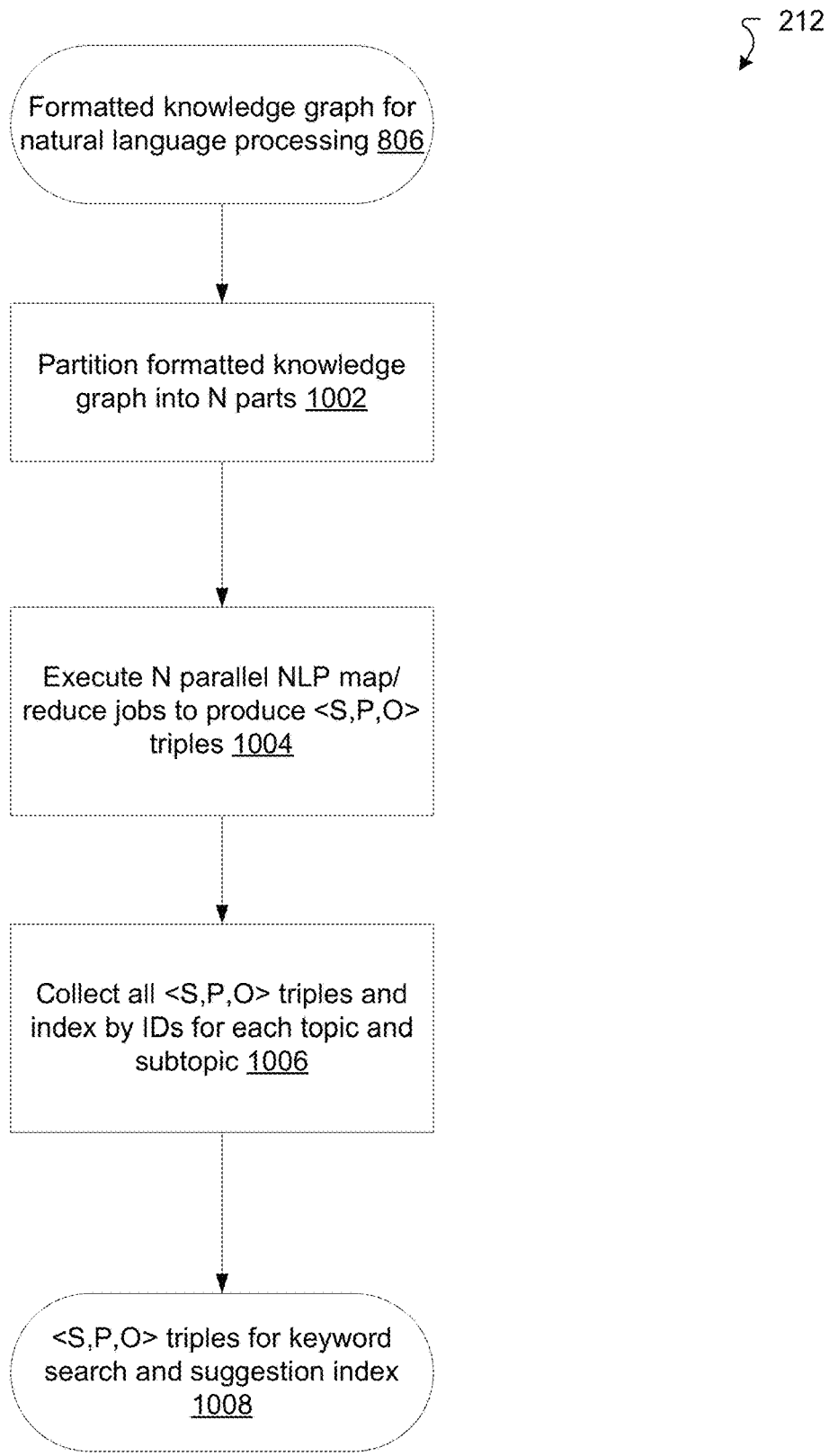
FIG. 10 is a flow chart illustrating an example process of generating <S,P,O> triples for a keyword search and suggestion index.

FIG. 10 is a flow chart depicting details of the process 212 of performing semantic analysis on the formatted KG 806. The process 212 may be performed by software constructs described in connection with FIG. 1, which reside in memory 126 of the computer 120 and are run by the set of processing units 124.

At 1002, a NLP pipeline (e.g, Adobe SedonaNLP) performs a MAP/REDUCE partition operation on the formatted KG 806 into N separate files, where N is a number of processor cores on which the semantic analysis is performed. In some implementations, N takes the value of at least 8. In some implementations, N is at least 16. In some implementations, N is 52. Such a partitioning is advantageous because the collection of documents 202 may have several hundred documents with each document including about 10-20 subtopics, descriptions, and detailed instructions. The formatted KG 806 may include several hundreds of thousands of topics, subtopics, descriptions, and instructions that will be parsed and annotated.

At 1004 (i.e., 214 in FIG. 2), the NLP pipeline executes semantic analyses on each of the N separate files in parallel. Such an analysis involves generating a MAP/REDUCE script that dispatches each of the N separate files to a respective MAP process instance for execution in parallel. Executing the MAP/REDUCE script at the MAP process instances produces N mapped files. The N mapped files are then input into respective REDUCE process instances—in some implementations, after a sorting process by keys generated in the MAP process instances—to create keyword, phrase, and verb/object <S,P,O> terms from the flattened KG 806 for final keyword search and suggestion indexing.

At 1006, the NLP pipeline collects all of the NLP annotations (e.g., the <S,P,O> terms) for each topic and subtopic into a keyword search and suggestion index 1008. The NLP annotations are identified by IDs for each topic and associated subtopics for each document of the collection of documents 202. In some implementations, the NLP annotations types are as follows:

exprType=ID indicates a topic element in the KG. Elements are as follows:

exprPOS—the Part-Of-Speech tagged element of the sentence/phrase expression exprRole—an indicator of whether the expr element is a subject, predicate (e.g, verb or preposition), or object exprType—an annotation indicating whether the element is a noun (NX), verb (VX), preposition (IN), or adjective (AX) expression All topics and subtopics across the entire collection of documents 202 are then aggregated into a master document index.

Figure 11:
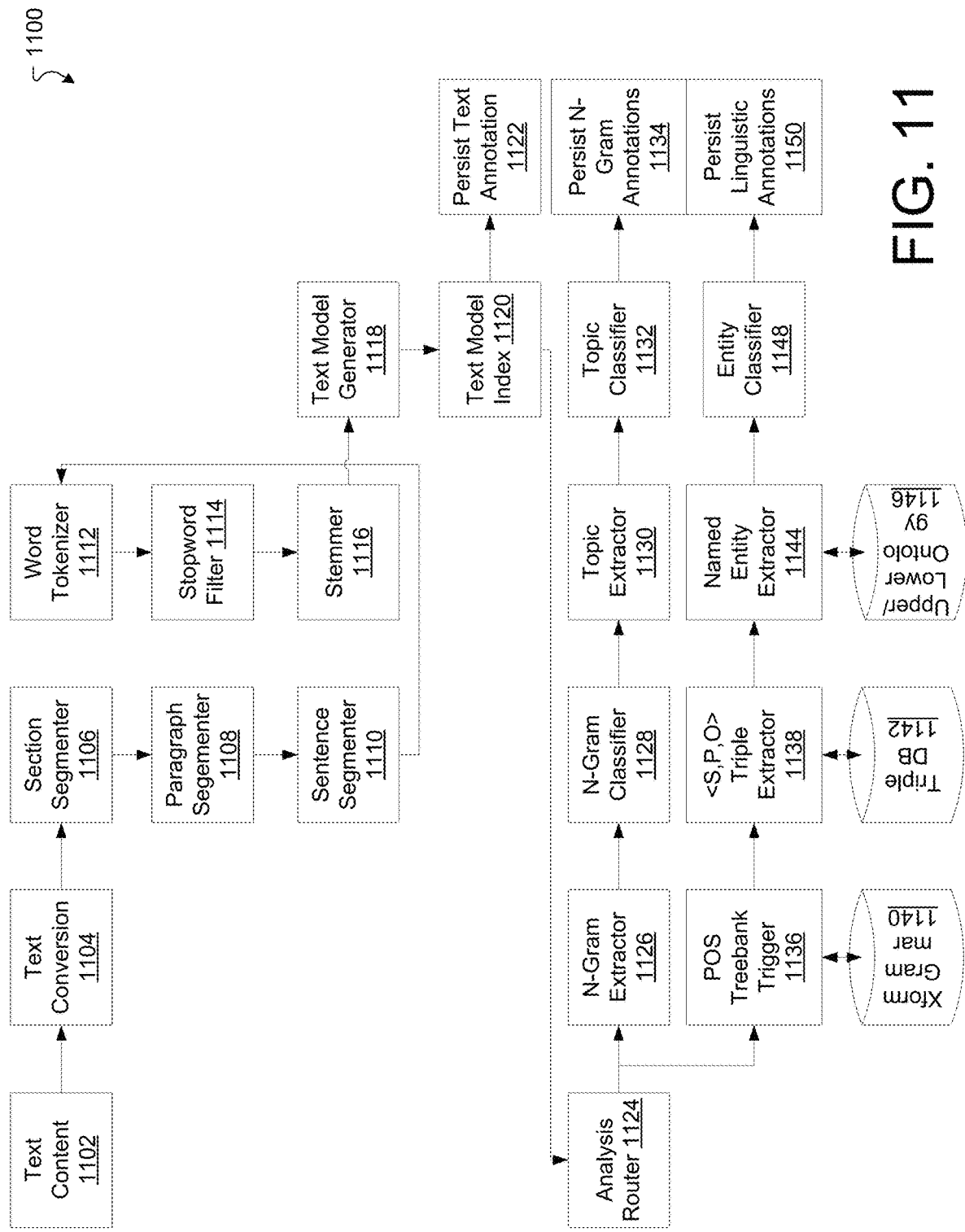
FIG. 11 is a flow chart illustrating an example NLP pipeline.

FIG. 11 is a flow chart illustrating an example NLP pipeline process 1100. The process 1100 may be performed by software constructs described in connection with FIG. 1, which in some implementations reside in memory 126 of the computer 120 and are run by the set of processing units 124.

The text content 1102 (e.g., a sentence) provides input text that is first normalized to UTF-8 through a text conversion module 1104, is then segmented and tokenized into syntactic language units by a section segmenter 1106, a paragraph segmenter 1108, a sentence segmenter 1110, and a word tokenizer 1112. Stopword filtering 1114 and stemming 1116 are applied to generate a structured model of the input text content elements 1118. This text model 1118 is then indexed by the text model index 1120 and sent to one or more NLP analysis flows. In some implementations, the flows include an N-gram extractor 1126, an N-gram classifier 1128, a topic extractor 1130, a topic classifier, and an N-gram persister 1134. In some implementations, the flows include a part-of-speech treebank trigger 1136, an <S,P,O> triple extractor 1138, a grammar transformer 1140, a triple database 1142, a named entity extractor 1144, an upper/lower ontology module 1146, an entity classifier 1148, and a linguistic annotations persister 1150.

In some implementations, the latter flows (i.e., 1136-1150) are used to annotate the words of each topic title and description with part-of-speech tags (e.g., using Penn Treebank) at 1136, then extract the <subject, predicate, object> semantic triples from the annotated text using 1138, while tagging all discovered noun terms using external word lexicon ontologies such as WordNet and custom ontologies 1144 and 1146. Tagged verb, noun, and adjective terms are classified and annotated by the entity classifier 1148 to indicate their lexical role for the specific topic or subtopic and then the entire annotation output is represented by a JSON-LD form is saved at 1150 for subsequent processing.

Figure 12:
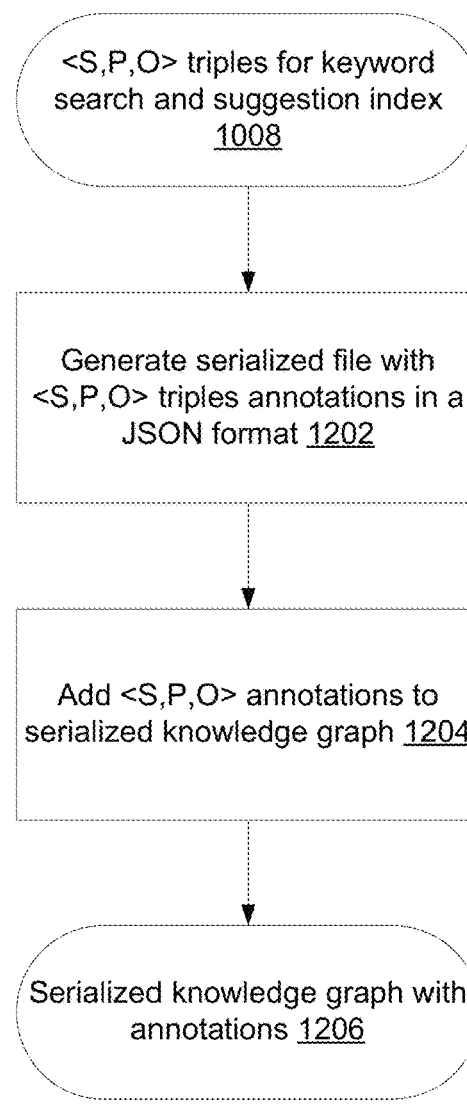
FIG. 12 is a flow chart illustrating an example process of generating a serialized knowledge graph with annotations.

FIG. 12 is a flow chart depicting details of the process 216 of generating a serialized KG with annotations 1206. The process 216 may be performed by software constructs described in connection with FIG. 1, which reside in memory 126 of the computer 120 and are run by the set of processing units 124.

At 1202, knowledge graph generation manager 140 uses the <S,P,O> triples for the keyword search and suggestion index 1008 to generate a serialized file with <S,P,O> triples annotations in a JSON format. Since each partitioned file generated at 1002 (FIG. 10) is processed by a separate NLP MAP process, all <S,P,O> result annotations in the generated JSON files saved at 1150 (FIG. 11) are, in some implementations, combined back into a final aggregate KG annotation file to generate the <S,P,O> index. This index allows a user to find all verb actions (e.g., create, edit, delete) that apply to a single object (e.g., image, mask), or for a single verb action (e.g., update), find all relevant objects to which this verb can apply (e.g., color curves, hue and saturation, the color of skin tone).

Generated topic <S, P, O> annotations from the NLP MAP/REDUCE processing stage are represented in JSON format. Unresolved parent sections and their corresponding reference ID anchors are resolved. Example NLP and Predicate, Object annotations for the subtopic "Define path for spin blur" are as follows:

```
{
"exprPOS": "PhotoshopElementsID-0029_03-[1746]-[1746]/_SDN.id",
"exprRole": false,
"exprType": "ID"
},
{
"exprPOS": "Define/VB",
"exprRole": "PRED-vx-1",
"exprType": "VX"
},
{
"exprPOS": "path/NN",
"exprRole": "OBJC-nx-1",
"exprType": "NX"
},
{
"exprPOS": "for/IN",
"exprRole": "OBJC-in-1",
"exprType": "IN"
},
{
"exprPOS": "spin/NN blur/NN",
"exprRole": "OBJC-nx-2",
"exprType": "NX"
}
```

Figure 13:
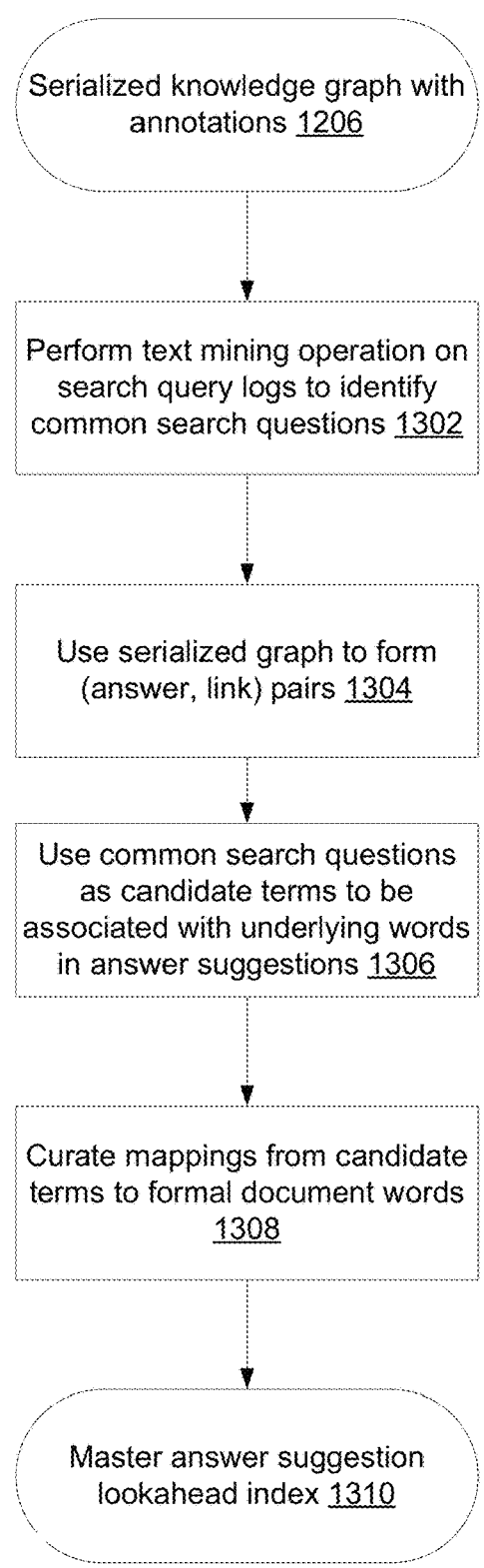
FIG. 13 is a flow chart illustrating an example process of generating a master suggestion lookahead index.

At 1204, the knowledge graph generation manager 140 adds these <S,P,O> annotations to the serialized KG 806 to produce a serialized KG 1206 with annotations. These <S, P, O> annotations taken in total produce many-to-one relationships for creating the verbs-to-noun search results. An example search experience to find all verb commands (e.g., "appear in", "convert between", "create", etc.) for a specific noun object (e.g., "a path") is as follows, with the phrase in italics being the topic corresponding to the respective search result:

Paths panel <=appear in—drawing modes paths <=Convert between—see also path to selection <=convert—understanding shapes and paths paths to selection borders <=Convert—see also path <=Create type along or inside—create type along or inside a path path <=define—spin blur path <=duplicate—create panorama ocr.png paths <=edit—tutorials photography jumpstart
path <=fill or stroke—understanding shapes and paths
path <=find out how to create type along—tutorials photography jumpstart
paths <=learn how to convert between—tutorials photography jumpstart
paths <=learn how to edit or adjust—tutorials photography jumpstart
path <=move—create panorama ocr.png The search experience similarly allows users to find all product noun objects (e.g., "perspective planes", "additional data sets", "constraints") that a verb command (e.g., "define") can apply to using one-to-many relationships for verb-to-nouns. This is shown below, with the phrase in italics being the topic corresponding to the respective search result:

define and adjust=>perspective planes—define and adjust perspective planes in vanishing point
define=>additional data sets—define a data set
define=>constraints to indicate straight lines—create panorama ocr.png
define=>data set—define a data set
define=>feathered edge—soften the edges of selections
define=>four corner nodes of plane surface—create panorama ocr.png
define=>horizon line—tutorials photography jumpset
define=>path—spin blur
define=>planes—adjust perspective
define=>point size unit—specify type size
define=>specific RGB—about color profiles
define=>variables—import a data set
define=>variables—define variables FIG. 13 is a flow chart depicting details of the process 218 of generating a master index suggestion lookahead index 1310 from the serialized KG 1206 with annotations. The process 218 may be performed by software constructs described in connection with FIG. 1, which reside in memory 126 of the computer 120 and are run by the set of processing units 124.

At 1302, the answer suggestion lookahead index manager 160 performs a text mining operation on a search query log (e.g., search query log data 152 in FIG. 1) to identify common search questions. In some implementations, the text mining operation is based on a question or keyword frequency in the search query log. Common questions are used to discover and extract new user vocabulary unknown to a search system or the collection of documents 202. For example, using this technique, questions like "how do I remove devil eyes?" where "devil eyes" is an unknown term—are readily discovered and can be mapped to equivalent questions about "red-eye removal" tool.

At 1304, the answer suggestion lookahead index manager 160 uses the serialized KG 1206 to identify and form (answer, link) pairs.

At 1306, the answer suggestion lookahead index manager 160 uses common search questions as candidate terms to be associated with underlying words in answer suggestions. In some implementations, this usage may be accomplished with the collection of documents 202 and newly learned vocabulary for topics, titles, and/or sentences.

At 1308, the answer suggestion lookahead index manager 160 curates mappings from candidate terms to formal document words to produce the master index suggestion lookahead index 1310. The candidate terms are discovered by the text mining. In some implementations, the curation may be performed by a content editor. The curation may allow the new vocabulary mappings to be reviews and added in a supervised manner.

A process for automatically mapping candidate vocabulary terms learned from the user search log can be accomplished by increasing the volume of query search log data that is text mined and then statistically determining a term count threshold to decide when to accept new terms to be associated with the formal underlying terms on the document of the collection of documents 202 corresponding to a particular topic.

To automatically acquire new vocabulary terms used by a customer, a set of query log entry pairs consisting of (query term, link) pairs are processed and clustered to determine equivalent phrasings or key terms for each topic or subtopic of the document of the collection of documents 202 corresponding to the particular topic page. Discovered phrasings or candidate terms whose occurrence count is above the sample-based threshold are then selected and included in the knowledge graph topic, subtopic, <S,P,O> triples annotations, and description index.

Returning to FIG. 2, at 220, the answer suggestion lookahead manager 160 deploys knowledge graph topic answers for semantic lookahead suggestions. This deployment sends answers to a front-end browser or mobile phone client. This process allows the question/answer suggestion lookahead manager 160 to work independently of a back-end search system if desired. The generated answer suggestion lookahead index 1310 supports generalized concept matching and not just strictly keyword matching like existing search systems or open-source lookahead modules.

Figure 14:
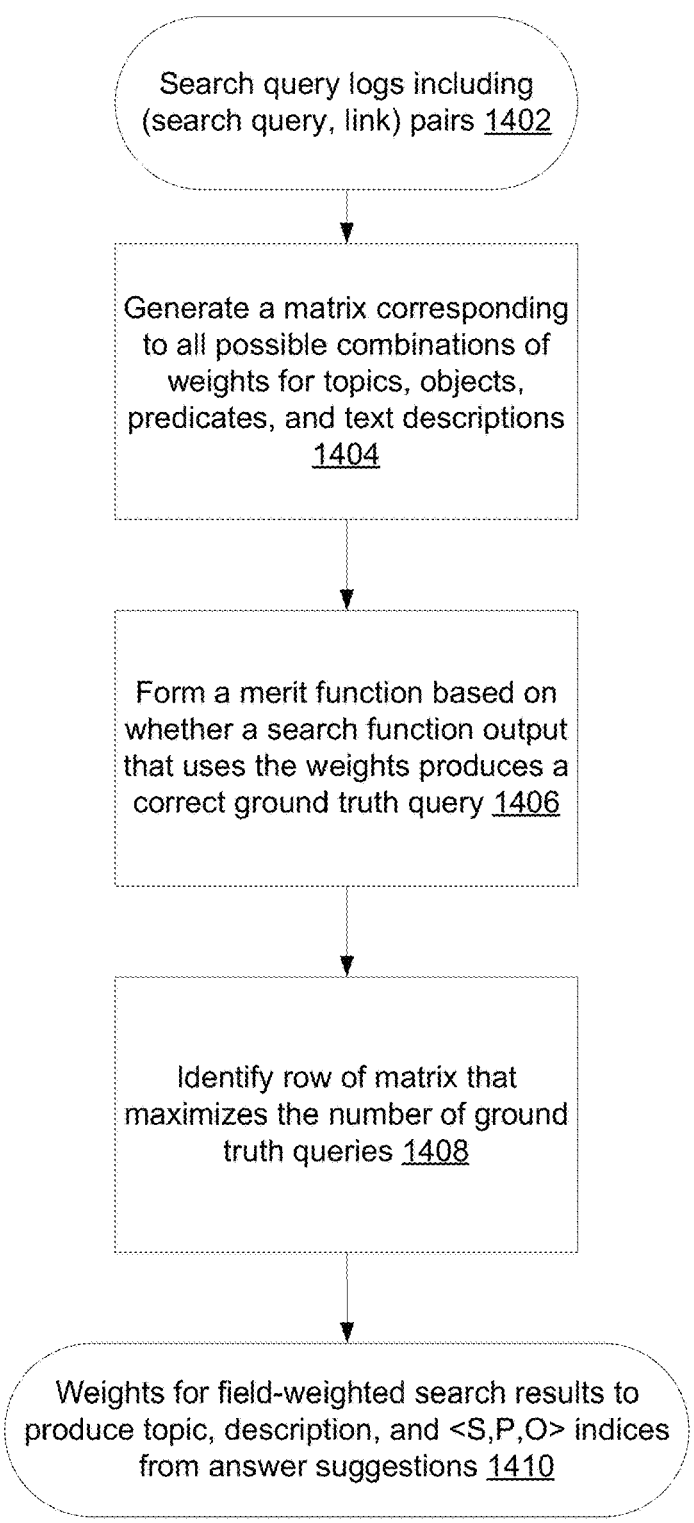
FIG. 14 is a flow chart illustrating an example process of generating weights for field-weighted search results.

FIG. 14 is a flow chart depicting details of the process 222 of generating optimal weights 1410 for field-weighted search results from search query logs 1402. The process 222 may be performed by software constructs described in connection with FIG. 1, which reside in memory 126 of the computer 120 and are run by the set of processing units 124.

At 1404, the answer suggestion lookahead manager 160 generates a matrix ω corresponding to all possible combinations of weights for four types of document text elements in order to exploit field level indexing during a search: topics, objects, predicates, and textual descriptions. A reason for the weights is that document text elements, identified above, have varying importance. The weights are used for indexing and query processing. The selection of the weights is performed by using question/answer pairs based on the actual (query, link) pairs. In some implementations, such pairs are created by a product documentation quality team. In some implementations, such pairs are found in the Adobe search logs. These pairs are used to determine index field weightings for the search engine during query processing to significantly improve answer or search result relevance.

Accordingly, the matrix ω has four columns and $M^4$ rows, where M is the number of samples between 0 and 1 for each weight. For example, when M=3, the matrix ω takes the following form:

$$\omega = \begin{pmatrix} 0.0 & 0.0 & 0.0 & 0.0 \\ 0.0 & 0.0 & 0.0 & 0.5 \\ 0.0 & 0.0 & 0.0 & 1.0 \\ 0.0 & 0.0 & 0.5 & 0.0 \\ 0.0 & 0.0 & 0.5 & 0.5 \\ 0.0 & 0.0 & 0.5 & 1.0 \\ \vdots & \vdots & \vdots & \vdots \\ 1.0 & 1.0 & 1.0 & 0.5 \\ 1.0 & 1.0 & 1.0 & 1.0 \end{pmatrix}.$$

Each column of the matrix ω corresponds to a respective document text element: a topic title field weight $\omega_{topic}$, a <S,P,O>predicate field weight $\omega_{predicate}$, a <S,P,O>object field weight $\omega_{object}$, and a topic text field weight $\omega_{text}$.

At 1406, the answer suggestion lookahead manager 160 forms a merit function based on whether a search function output that uses the weights from a row of the matrix ω produces a correct ground truth query. The ground truths are a set of pairs (query $q_i$, link $L_{GTi}$) that are human-curated and are known to be a gold standard. That is, the ground truths represent a set of links selected by a user after the user inputs a query into a search engine. For example, in response to a query $q_i$="add caption to image," the user selected the link $L_{GTi}$=https://helpx.adobe.com/photoshop-elements/using/add-text.html.

A search function of a search engine that takes the above-defined weights into account may be defined as follows:

$$f_{search}(q_i, \omega_j) = \begin{pmatrix} L_1 & S_1 \\ L_2 & S_2 \\ \vdots & \vdots \\ L_m & S_m \end{pmatrix},$$

where the $S_k$, $k \in \{1, 2, \ldots, m\}$ are scores corresponding to the links $L_k$ returned by the search engine. That is, the search engine returns the top m links according to scores based on the weights used.

It is of interest to determine which weights will return the most correct ground truth queries. In some implementations, such a determination may be made using the following merit function:

$$\omega' = \underset{j}{\operatorname{argmax}} \sum_{i=1}^{K} eval(f_{search}(q_i, \omega_j), L_{GTi}),$$

where there are K ground truths, and $$eval(f_{search}(q_i, \omega_j), L_{GTi}) = \begin{cases} 1, & L_k = L_{GTi} \\ 0, & \text{otherwise} \end{cases}.$$

$L_k$ represents a link returned by the $f_{search}$ function.

At 1408, the answer suggestion lookahead manager 160 uses the merit function to identify the row 1410 of the matrix that maximizes the number of ground truth queries. Thus, ω' represents the values of the four weights that maximize the number of ground truth queries. In some implementations, it has been found that such weight values may equal ($\omega_{topic}$, $\omega_{predicate}$, $\omega_{object}$, $\omega_{text}$)=(0.44,0.22,0.22,0.11).

The above discussion has been directed to forming the answer suggestion lookahead index and search engine that will provide an answer to a user query based on the intent of the user. Nevertheless, there is a front end of the search engine that accepts queries as input and provides, in some implementations, answer cards that directly provide the answer to the user query intended by the user.

Figure 15:
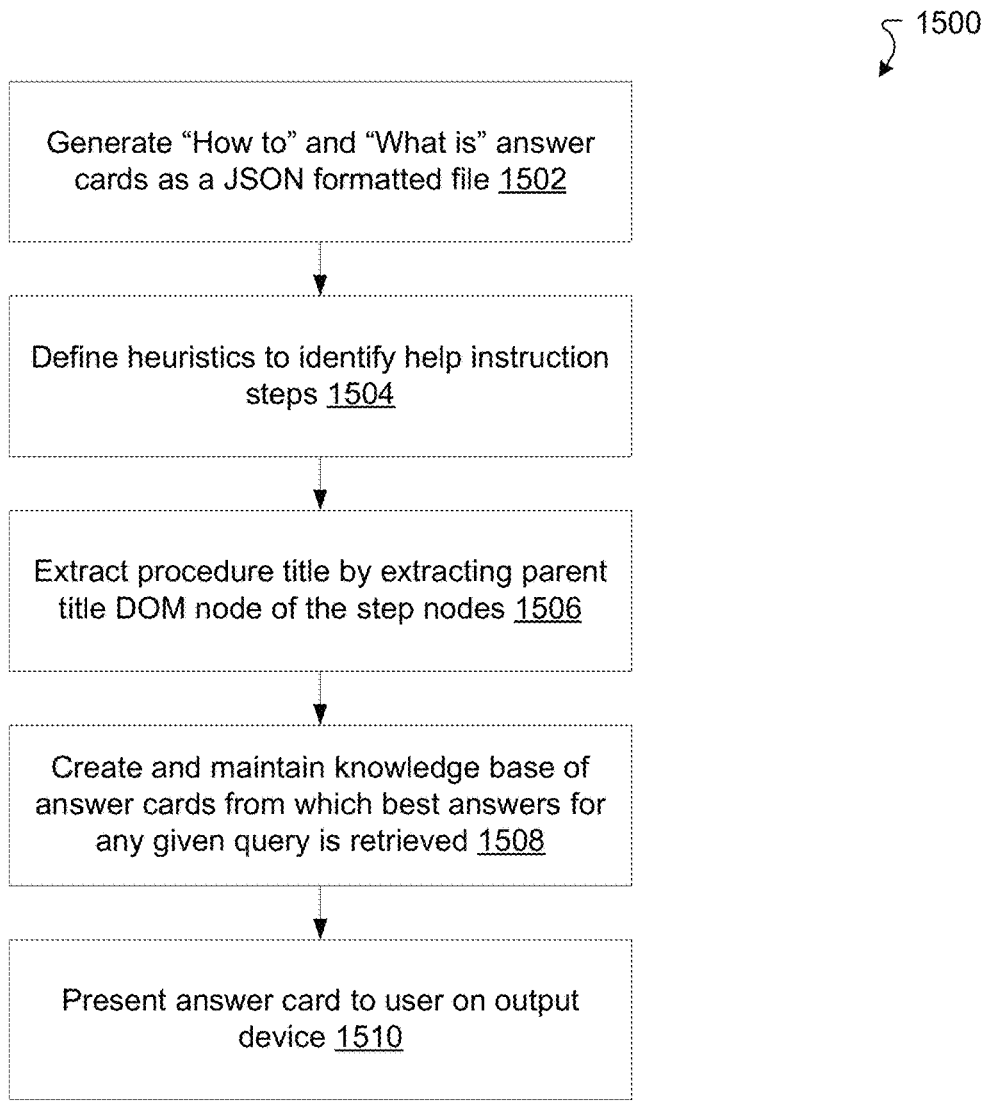
FIG. 15 is a flow chart illustrating an example process of presenting an answer card to a user on an output device.

FIG. 15 is a flow chart depicting details of a process 1500 of presenting answer cards to a user in response to a user query. The process 1500 may be performed by software constructs described in connection with FIG. 1, which reside in memory 126 of the computer 120 and are run by the set of processing units 124.

At 1502, the answer card presentation manager 180 generates "how to" and "what is" answer cards as JSON formatted files. Each answer card is based on the textual description corresponding to a topic or subtopic of a document of the collection of documents 202. The answer cards are described in further detail with regard to FIGS. 16A and 16B.

At 1504, the answer card presentation manager 180 defines heuristic to identify help instruction steps. For example, one heuristic involves classifying texts starting with "<number>", or "Step<number>" as a step. Other heuristics include learning markup within the help webpage text that indicates step elements, e.g. CSS class names such as "step-title" or "headline".

At 1506, the answer card presentation manager 180 extracts procedure titles by extracting a parent title DOM node of the step nodes. For each step node, the span of the step is included to include more DOM nodes. As an example, consider the JSON How-To representation at 1502. In the listing, the DOM nodes starting with "1. To apply a Curves adjustment . . . ", "2. Do one of the following", etc. are extracted as a step (by the heuristic rules). Then, the span of each step is extended—e.g., the span of Step 2 is extended to include the next lines up to Step 3, "Click the Curves Icon." Once the steps are identified, the pipeline extracts their procedure title by extracting the parent title DOM node of the step nodes. In the above example, "Adjust image color and tone with Curves" is extracted as a title for the steps At 1508, the answer card presentation manager 180 creates and maintains a knowledge base of answer cards from which the best answers for any given query is retrieved. Using this knowledge base, for any input question intent, a search of the question database uses a semantic similarity search to locate the canonical question and associated answer card.

At 1510, the answer card presentation manager 180 presents the answer card to the user on an output device (e.g., display 190 in FIG. 1).

FIG. 16A is a diagram illustrating an example "how to" answer card 1600 as described above, in a JSON format. In this format, there is a "steps" field that separates out each step in the process as described above.

FIG. 16B is a diagram illustrating an example "what is" answer card 1650, in a JSON format. In this case, there is an "answer contents" field that has, as subfields, a "term" and "similar terms," the latter being determined through the query logs.

Figure 17:
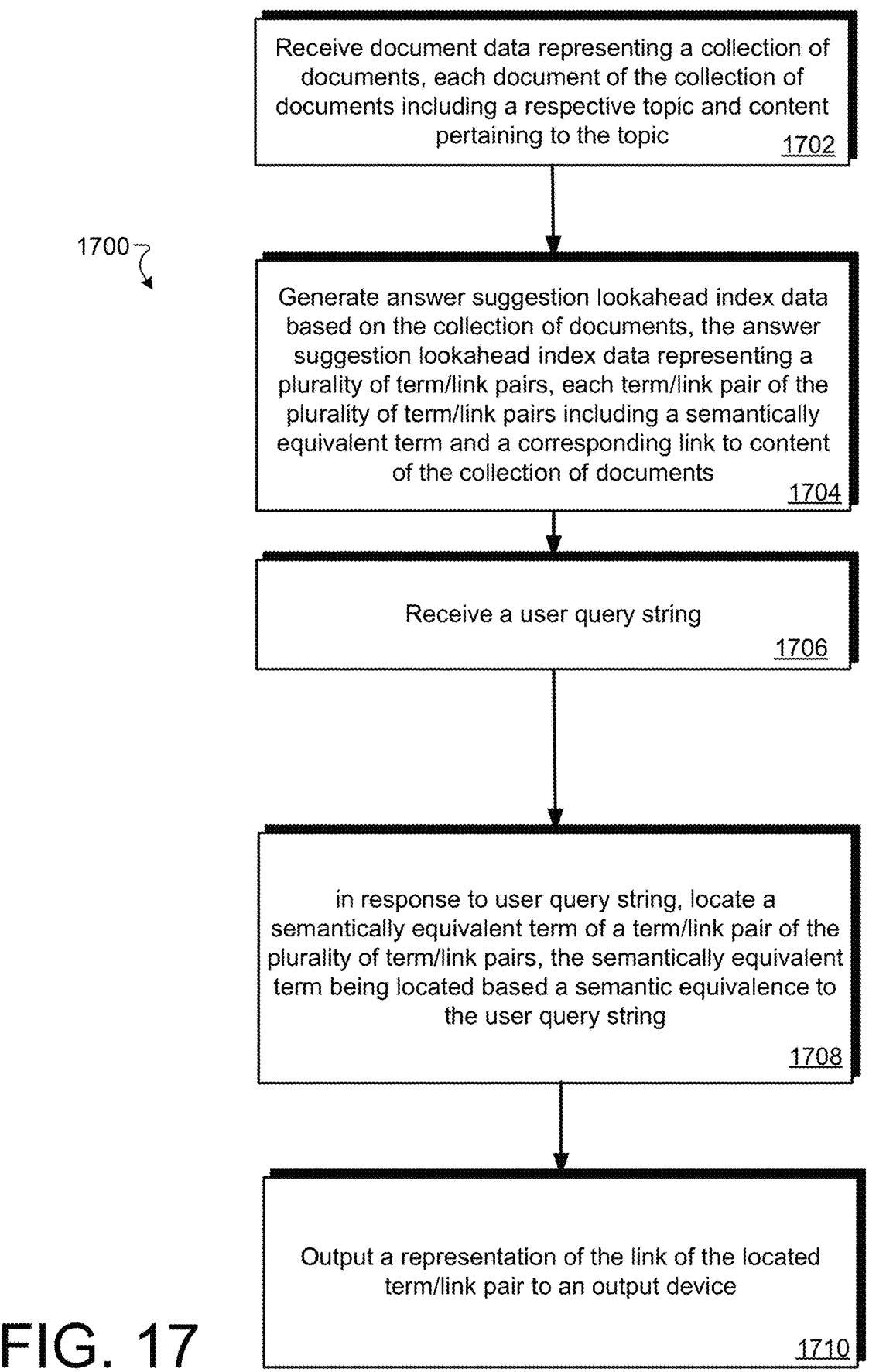
FIG. 17 is a diagram illustrating an example method of performing the improved technique.

FIG. 17 is a flow chart illustrating an example method 1700 of performing the improved technique described herein. The method 1700 may be performed by software constructs described in connection with FIG. 1, which reside in memory 126 of the computer 120 and are run by the set of processing units 124.

At 1702, the computer 120 receives document data representing a collection of documents, each document of the collection of documents including a respective topic and content pertaining to the topic.

At 1704, the computer 120 generates answer suggestion lookahead index data based on the collection of documents, the answer suggestion lookahead index data representing a plurality of term/link pairs, each term/link pair of the plurality of term/link pairs including a semantically equivalent term and a corresponding link to content of the collection of documents.

At 1706, the computer 120 receives a user query string.

At 1708, the computer 120, in response to the user query string, locates a semantically equivalent term of a term/link pair of the plurality of term/link pairs, the semantically equivalent term being located based a semantic equivalence to the user query string.

At 1710, the computer 120 outputs a representation of the link of the located term/link pair to an output device.

A number of embodiments have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method, comprising:
receiving document data representing a collection of documents, each document of the collection of documents including a respective topic and content pertaining to the topic;
for each document of the collection of documents, generating a respective document object model (DOM) of a set of DOMs, the respective DOM corresponding to each document, the DOM corresponding to each document including a topic, a set of subtopics, and links to the content of each document;
aggregating the set of DOMs to generate a master link list for a topic knowledge graph, the master link list including a plurality of unique links to the content of the collection of documents;
generating answer suggestion lookahead index data based on the collection of documents, the answer suggestion lookahead index data representing a plurality of term/link pairs, wherein the answer suggestion lookahead index data comprises the topic knowledge graph and the master link list;
receiving a user query string;
in response to receiving the user query string, locating a semantically equivalent term of a term/link pair of the plurality of term/link pairs, the semantically equivalent term being located based a semantic equivalence to the user query string; and
outputting a representation of the link of the located term/link pair to an output device.

2. The method of claim 1, wherein generating the answer suggestion lookahead index data includes:
generating the topic knowledge graph data based on the collection of documents, the topic knowledge graph data representing a topic knowledge graph that includes (i) the respective topic and the set of subtopics of each of the collection of documents, and (ii) the links to the content of the collection of documents, each of the links corresponding to one of the respective topic or subtopic of the set of subtopics of each of the collection of documents.

3. The method of claim 2, wherein generating the answer suggestion lookahead index data further includes:
generating semantic annotation data representing respective semantic annotations to the topic and set of subtopics of each of the collection of documents, each of the semantic annotations including a respective predicate of a set of predicates and a respective object of a set of objects;
identifying, for each predicate of the set of predicates, at least one object of the set of objects that, when combined with that predicate, correspond to one of a topic or a subtopic of the set of subtopics of each of the collection of documents; and
identifying, for each object of the set of objects, at least one predicate of the set of predicates that, when combined with that object, correspond to one of a topic or a subtopic of the set of subtopics of each of the collection of documents.

4. The method of claim 2, wherein generating the topic knowledge graph data includes:
formatting the set of DOMs to produce an aggregate flattened knowledge graph formatted for a natural language processing (NLP) pipeline.

5. The method of claim 4, wherein the aggregate flattened knowledge graph includes at least one of the topic and set of subtopics of each DOM of the set of DOMs, the NLP pipeline being configured to produce <S,P,O>triplets consisting of subject, predicate, and object for each of the topic and set of subtopics of each of the set of DOMs.

6. The method of claim 4, wherein generating the topic knowledge graph data further includes:
splitting the aggregate flattened knowledge graph to produce a plurality of aggregate flattened knowledge graph parts; and
performing natural language processing by the NLP pipeline on each of the plurality of aggregate flattened knowledge graph parts to produce the knowledge graph, the natural language processing being performed on each of the plurality of aggregate flattened knowledge graph parts in parallel.

7. The method of claim 4, wherein generating the DOM of the set of DOMs includes:
identifying non-informative content of each document of the collection of documents; and removing the non-informative content of that document to produce the topic, the set of subtopics, and the links to the content of that document, the removing including applying a term frequency inverse document frequency (TF-IDF) algorithm to that document.

8. The method of claim 4, wherein generating the DOM of the set of DOMs includes:
reformatting each document of the collection of documents to produce the document formatted in a Markdown Markup language (MDML).

9. A computer program product comprising a nontransitory storage medium, the computer program product including code that, when executed by processing circuitry of a computer configured to direct a user to content based on a semantic interpretation of a query input by the user, causes the processing circuitry to perform a method, the method comprising:
receiving document data representing a collection of documents, each document of the collection of documents including a respective topic and content pertaining to the topic;
obtaining the search query log data, the search query log data representing a mapping between user query data and links to content of the collection of documents, the user query data representing a plurality of user queries;
performing a text mining operation on the search query log data to produce the set of common user queries for one of a topic or a respective subtopic of a set of subtopics of a document of the collection of documents, each of the topic and set of subtopics being associated with respective content corresponding to a respective link;
generating answer suggestion lookahead index data based on the collection of documents, the answer suggestion lookahead index data representing a plurality of term/link pairs, each term/link pair of the plurality of term/link pairs including a link to content of the collection of documents, wherein the answer suggestion lookahead index data is generated based at least in part on a set of common user queries obtained using search query log data;
receiving a user query string;
in response to receiving the user query string, locating a semantically equivalent term of a term/link pair of the plurality of term/link pairs, the semantically equivalent term being located based a semantic equivalence to the user query string; and
outputting a representation of the link of the located term/link pair to an output device.

10. The computer program product of claim 9, wherein generating the answer suggestion lookahead index data includes:
generating topic knowledge graph data based on the collection of documents, the topic knowledge graph data representing a topic knowledge graph that includes (i) a respective topic and a set of subtopics of each of the collection of documents, and (ii) links to the content of the collection of documents, each of the links corresponding to one of a respective topic or subtopic of the set of subtopics of each of the collection of documents.

11. The computer program product of claim 10, wherein generating the answer suggestion lookahead index data further includes:
forming pairs of (i) a respective user query of the set of common user queries and (ii) a respective link to content of the collection of documents, each pair based on annotated topics and sets of subtopics of the topic knowledge graph, the annotated topics and sets of subtopics including topic titles and <S,P,O>triplets consisting of subject, predicate, and object for each of the topics and sets of subtopics, and
wherein producing the link to specific content in the collection of documents includes:
identifying a pair of a user query and a link to the content that is a semantic best match to the predicate and object to a predicate and object of the received user query string.

12. The computer program product of claim 11, wherein forming the pairs of user query and link to the content includes:
generating a respective weight corresponding to each of a topic title, a subject, a predicate, and textual content corresponding to the topic title of the pairs of the user query and the link to the content, and
wherein identifying the pair of the user query and the link to the content that is a semantic best match to the predicate and object to a predicate and object of the received user query string includes:
generating a linear combination of the topic title, the subject, the predicate, and the textual content using the respective weight corresponding to each of the topic title, the subject, the predicate, and the textual content of the set of common user queries that most closely matches the same linear combination of a topic title, a subject, a predicate, and textual content corresponding to the user query string.

13. The computer program product of claim 12, wherein generating the respective weight corresponding to each of the topic title, the subject, the predicate, and the textual content corresponding to the topic title of the pairs of the user query and the link to the content includes:
generating a matrix having a plurality of rows, each of the plurality of rows having elements equal to a respective weight of the topic title, the subject, the predicate, and the textual content;
for each of the pairs of user query and link to the content of the set of common user queries, forming a merit function that takes as arguments (i) a search function of the user query data, the links to content of the collection of documents, and a row of the matrix, and (ii) a particular link to content of the collection of documents, the search function returning a link as an output, the merit function having a value of one in response to the link output of the search function being equal to the particular link and a value of zero in response to the link output of the search function not being equal to the particular link; and
identifying, as the weight corresponding to each of the topic title, the subject, the predicate, and the textual content, the row of the matrix that causes the merit function to take on a maximum value.

14. An electronic apparatus configured to direct a user to content based on a semantic interpretation of a query input by the user, the electronic apparatus comprising:
a network interface;
a memory; and
controlling circuitry coupled to the memory, the controlling circuitry being configured to:
receive document data representing a collection of documents, each document of the collection of documents including a respective topic and content pertaining to the topic;

generate answer suggestion lookahead index data based on the collection of documents, the answer suggestion lookahead index data representing a plurality of term/link pairs, and wherein the answer suggestion lookahead index data comprises a topic knowledge graph that includes, for one or more topics, links to content corresponding to other topics;

receive a user query string;

in response to receiving the user query string, locate a semantically equivalent term of a term/link pair of the plurality of term/link pairs, the semantically equivalent term being located based a semantic equivalence to the user query string; and output a representation of the link of the located term/link pair to an output device; and display an answer card corresponding to the link of the located term/link pair, the answer card including a window in which the content corresponding to the link is contained.

15. The electronic apparatus of claim 14, wherein the controlling circuitry configured to generate the answer suggestion lookahead index data is further configured to:

generate topic knowledge graph data based on the collection of documents, the topic knowledge graph data representing the topic knowledge graph that includes (i) the respective topic and a set of subtopics of each of the collection of documents, and (ii) the links, each of the links corresponding to one of a respective topic or subtopic of the set of subtopics of each of the collection of documents.

16. The electronic apparatus of claim 14, wherein the controlling circuitry configured to locate the semantically equivalent term of a term/link pair of the plurality of term/link pairs is further configured to:

locate content that includes text indicating a step of a process; and identify the topic to which the content corresponds.

* * * * *